United States Patent
Plummer et al.

(10) Patent No.: US 10,554,439 B2
(45) Date of Patent: Feb. 4, 2020

(54) CONTROLLING SETTINGS AND ATTRIBUTES RELATED TO OPERATION OF DEVICES IN A NETWORK

(71) Applicant: Belkin International, Inc., Playa Vista, CA (US)

(72) Inventors: Jon Robertsen Plummer, Los Angeles, CA (US); Ryan Yong Kim, Rolling Hills Estates, CA (US); Venkata Subba Rao Pathuri, Alpharetta, GA (US); Sarah Gallivan Mitchell, Santa Monica, CA (US); Matt Glidden, Manhattan Beach, CA (US); Douglas Edward McLaughlin, Los Angeles, CA (US)

(73) Assignee: Belkin International, Inc., Playa Vista, CA (US)

( * ) Notice: Subject to any disclaimer, the term of this patent is extended or adjusted under 35 U.S.C. 154(b) by 433 days.

(21) Appl. No.: 14/326,393

(22) Filed: Jul. 8, 2014

(65) Prior Publication Data

US 2015/0319046 A1 Nov. 5, 2015

Related U.S. Application Data

(63) Continuation-in-part of application No. 14/267,834, filed on May 1, 2014.

(51) Int. Cl.
*G06F 15/177* (2006.01)
*H04L 12/28* (2006.01)
*H04L 12/24* (2006.01)

(52) U.S. Cl.
CPC ...... *H04L 12/2834* (2013.01); *H04L 12/2807* (2013.01); *H04L 12/2818* (2013.01); *H04L 41/22* (2013.01); *H04L 2012/2841* (2013.01)

(58) Field of Classification Search
CPC ............. H04L 12/2803; H04L 12/2816; G06F 3/0482; H04K 12/2816
(Continued)

(56) References Cited

U.S. PATENT DOCUMENTS

| 7,231,592 B2 | 6/2007 | Humpleman et al. |
| 2010/0122215 A1* | 5/2010 | MacGregor ........... G06F 3/0482 715/834 |

(Continued)

FOREIGN PATENT DOCUMENTS

KR 20140029141 A * 3/2014 ........ H04M 1/72533

OTHER PUBLICATIONS

SkylinkHome "WE-318 On/Off Wall Switch Receiver with Snap-On Remome" retrieved from http://www.amazon.com/SkylinkHome-WE-318-Receiver-Snap-On-Installation/dp/B0052ROBZ6/ref=sr_1_1?s=hi&ie=UTF8&qid=1403112155&sr=1-1&keywords=skylinkhome+switch on Jul. 31, 2014, 7 pages.

(Continued)

*Primary Examiner* — Andrey Belousov
(74) *Attorney, Agent, or Firm* — Kilpatrick Townsend & Stockton LLP

(57) ABSTRACT

Techniques are described for controlling attributes and/or settings related to operation of devices via a wireless network. An access device can determine a status of a configurable attribute/setting related to operation of a device (e.g., a home automation network device that can control a home appliance) connected to the network. The computing device can execute an application that can generate and display a graphical interface including an interactive area or an interactive element to control the device. The interactive element or the graphical interface can indicate a current value for the setting/attribute. The interactive area or element can be adjustable to adjust the setting/attribute. An adjusted value (Continued)

of the setting/attribute can be communicated to the network which can cause operation of the device to be controlled based on the adjusted value. The computing device can modify the graphical interface to indicate the adjusted value of the setting/attribute.

23 Claims, 20 Drawing Sheets

(58) Field of Classification Search
USPC .......................................... 715/736, 734, 781
See application file for complete search history.

(56) References Cited

U.S. PATENT DOCUMENTS

| | | | |
|---|---|---|---|
| 2012/0321008 A1* | 12/2012 | Krishnaswamy | H04W 4/06 375/267 |
| 2014/0380234 A1* | 12/2014 | Shim | G06F 3/0482 715/781 |
| 2015/0319006 A1 | 11/2015 | Plummer et al. | |

OTHER PUBLICATIONS

Insteon Wireless Switch, retrieved from http://www.insteon.com/2342-x42-mini-remote.html on Jul. 31, 2014, 2 page.
Smarthome, "SkylinkHome SK-8 Wireless Remote 3-way On/Off Kit" retrieved from http://www.smarthome.com/73027/SkylinkHome-SK-8-Wireless-Remote-3-Way-On-Off-Kit/p.aspx Jul. 31, 2014, 5 pages.
Leviton 6696-W Anywhere Switch RF Remote Decora 3-Way Switch retrieved from http://www.amazon.com/Leviton-6696-W-Anywhere-Switch-Remote/dp/B00004YUOL on Jul. 31, 2014, 8 pages.
Smarthome, Carlon HW2172 Battery Powered Wireless Wall Switch and Plug-in on/Off Module retrieved from http://www.smarthome.com/25330/Carlon-HW2172-Battery-Powered-Wireless-Wall-Switch-and-Plug-in-On-Off-Module-White/p.aspx on Jul. 31, 2014, 3 pages.
Sierra Tools "JB5571 Battery-Operated Ceiling/Wall Light with Remote", retrieved from http://www.amazon.com/Sierra-Tools-JB5571-Battery-Operated-Ceiling/dp/B002MYIPKE/ref=pd_sim_hg_2?ie=UTF8&refRID=1FSRY586CAYRZRRHCBYR on Jul. 31, 2014, 7 pages.
SmartThings, "Easy & Affordable Smart Home Automation" retrieved from http://www.smartthings.com on Jun. 19, 2014, 5 pages.
SmartThings Product, retrieved from http://www.smartthings.com/product/ on Jun. 19, 2014, 9 pages.
SmartThings Hub, retrieved from https://shop.smartthings.com/#!/products/smartthings-hub on Jun. 19, 2014, 16 pages.
SmartThings GE Light & Appliance Plug-and-Control Power Outlet, retrieved from https://shop.smartthings.com/#!/products/ge-z-wave-wireless-lighting-control-lamp-module on Jun. 19, 2014, 14 pages.
Quirky, "Shop for products invented by real people" retrieved from http://www.quirky.com on Jul. 2, 2014, 1 page.
Quirky Spotter, retrieved from http://www.quirky.com/shop/609-spotter-multi-purpose-sensor on Jul. 2, 2014, 4 pages.
Electric Imp, "Connectivity Made Simple" retrieved from http://electricimp.com/ on Jun. 19, 2014, 2 pages.
Electric Imp Product, retrieved from http://electricimp.com/product/ on Jun. 19, 2014, 3 pages.
Electric Imp, "The Interactive imp: how to manage communication between app, agent and device" retrieved from http://electricimp.com/docs/resources/interactive/ on Jun. 19, 2014, 11 pages.
Electric Imp. "How to run an imp offline: Making-and breaking-Internet connections" retrieved from http://electricimp.com/docs/resources/offline/ on Jun. 19, 2014, 9 pages.
Electric Imp, Inc. "specification: imp001 version 20140226" http://www.electricimp.com/ (2014) 14 pages.
Electric Imp, Inc. "specification: imp002 version 20140226" http://www.electricimp.com/ (2014) 18 pages.
Crock-Pot, "Coming Soon! Crockpot® Smart Slow Cooker enabled with WeMo™" retrieved from http://www.crock-pot.com/slow-cookers/coming-soon%21-crock-pot%C2%AE-smart-slow-cooker-enabled-with-wemo%E2%84%A2/SCCPWM600-V1.html on Apr. 14, 2014, 6 pages.
U.S. Appl. No. 14/267,834, "Final office Action", dated Apr. 25, 2017, 10 pages.
U.S. Appl. No. 14/267,834, "First Action Interview Office Action Summary", dated Nov. 25, 2016, 4 pages.
U.S. Appl. No. 14/267,834, "First Action Interview Pilot Program Pre-Interview Communication", dated Jun. 13, 2016, 4 pages.

* cited by examiner

CONTROLLING SETTINGS AND ATTRIBUTES RELATED TO OPERATION OF DEVICES IN A NETWORK

CROSS-REFERENCES TO RELATED APPLICATIONS

The present application is a continuation-in-part of Non-Provisional U.S. patent application Ser. No. 14/267,834, filed May 1, 2014, entitled "CONTROLLING SETTINGS AND ATTRIBUTES RELATED TO OPERATION OF DEVICES IN A NETWORK," which is hereby incorporated by reference in its entirety for all intents and purposes.

TECHNICAL FIELD

The present disclosure relates to controlling attributes and/or settings related to operation of devices via a network. Specifically, various techniques and systems are provided for providing interfaces to enable configuration of attributes and/or settings related to operation of devices (e.g., appliances) via a wireless network.

BACKGROUND

Any residence, office, or establishment may have devices (e.g., lamps, fans, sensors, heaters, light bulbs, etc.) that are configurable. These devices may be adjustable to control various attributes and/or settings (e.g., speed, power, brightness, sensitivity, etc.) related to operation of those devices. Some devices that are adjustable may be operated remotely within a wireless network. For example, a home automation device may provide a user with the ability to control one or more appliances within the user's home. However, some devices may have different capabilities and functionalities. The differences in capabilities and functionalities of network-enabled devices may present challenges for controlling of attributes through use of a home automation network device. Remote devices may be unfamiliar with different interfaces and/or capabilities of the devices to provide an interface for controlling different types of devices.

BRIEF SUMMARY

Techniques are described for controlling attributes and/or settings related to operation of devices via a wireless network. A computing device (e.g., an access device) can determine a status of one or more attributes and/or settings related to operation of one or more devices connected to a wireless network. The devices can include network devices, such as home automation network devices, which can control home appliances and devices (e.g., a lamp, a sensor, a heater, a fan, a switch, or a light bulb) that may have adjustable settings and/or attributes related to operation of the devices. The attributes and/or settings may be adjustable or configurable within a range of values or between different states. The computing device can execute an application that can generate and display a graphical interface including an interactive element or interactive area to control a device on the network. The interactive element or graphical interface can indicate a current value for each setting for the device. The interactive element or area can be adjustable to adjust one or more of the settings. The computing device can communicate an adjusted value of the setting to the network. The communication of the adjusted value can cause operation of the device to be controlled based on the adjusted value. The computing device can modify the graphical interface to indicate the adjusted value of the status.

In some embodiments, a computing device may initially determine the devices that are connected to a network. The determination may be made based on whether the computing device located within the wireless network of the devices or located remote from the wireless network. The computing device may have access to the wireless network based on its authentication with a logical network which enables access to the wireless network. In some embodiments, the computing device may perform local network discovery while within the wireless network to identify the devices connected to the network. Upon determining that the computing device is not located within the network, the computing device can determine the devices on the network by communicating with a cloud network to obtain information about devices on the network. The cloud network can store a status of devices on the network. The computing device can also determine devices on the network by accessing a local cache that can contain information it has previously received about devices known to exist on the network. The computing device can determine a status of the devices based on its local cache, information received from the cloud, or by direct communication with the devices within the local network. The computing device can access status information from the local cache to present in a display to a user.

In some embodiments, the computing device can execute an application that can cause the computing device to present the graphical interface containing information (e.g., status) about devices discovered in the network. The graphical interface can present a visual interface for each device accessible on the network. In some embodiments, the visual interface corresponding to a device can be rendered as a modular tile with one or more interactive elements or one or more interactive areas to control operation of the device. The visual interface corresponding to a device can provide a status of the device. These basic properties can include, for example, a default icon, a default name, interactive elements, and/or interactive areas for controlling one or more functionalities of a device. The functionalities can include, for example, powering the network device on and off. The functionalities can enable adjustment of adjustable attributes and/or settings for a device. For example, a device can be a light bulb, for which attributes or settings can be controlled via the tile.

In certain embodiments, the status or state of a device can be indicated in the graphical interface, such as within the tile, with text and/or graphically. The status of the device can change based on time (e.g., a period, an interval, or other time schedule). The status of a device may be any piece of information pertinent to that particular device. The status of a device may be any adjustable of changeable variable, attribute, or setting related to operation of that particular device. For example, the status of a device may include a state of the device itself (e.g., on or off). In certain embodiments, the status can include a value or other criteria for a setting or an attribute related to operation of a device. The setting or the attribute can be adjustable within a range of values. For example, the device can be a light bulb and the status can include a value corresponding to an amount of brightness (e.g., a percentage of total brightness) emitted by the light bulb when the light bulb is powered-on.

In certain embodiments, the tile or an interactive element in the tile, or an interactive area in the graphical interface or the tile, can enable interaction to dynamically adjust one or more settings and/or attributes related to operation of a device corresponding to the tile. In some embodiments, a status of the tile may be dynamically displayed in the tile in response to the interaction. All or some of an appearance of the tile, an image in the tile, or an interactive element can be modified to indicate a new state or a change in the setting or the attribute of the device. In some embodiments, an appearance of the tile, an image in the tile, or an interactive element can be modified corresponding to a gradual change in a state or an attribute/setting of the device until a desired state or value of an attribute/setting is reached. For example, a light bulb shown in the tile may be modified to include an animation, color, sound, information, etc. to indicate a change in the setting. In some embodiments, the light bulb may be displayed as being filled, dimmed, or brightened by an amount corresponding to the adjusted setting (e.g., brightness). In some embodiments, interaction with the graphical interface (e.g., a motion or a swipe of a finger on a display) can cause adjustment to be made for an attribute related to operation of the device.

In some embodiments, the tile can include or cause additional visual interfaces (e.g., menus or drawers) to be displayed within the graphical interface. The visual interfaces can enable control of settings and/or attributes related to operation of a device (or multiple devices in a group) corresponding to the tile. For example, a tile can include a drawer that displays options for secondary functionalities in response to a selection made for a primary functionality (e.g., controlling a power state) for a device. In certain embodiments, the drawer can display secondary settings, including a default, implied secondary setting for a device, wherein the implied secondary setting is tied to a setting selected for a primary function. The secondary settings can affect the operation of the device and can be related to scheduling operation of the device (i.e., setting on/off times), selecting auto off timeouts or thresholds, selecting settings for putting the device into a standby, hibernate, or sleep mode, and/or controlling adjustable features (e.g., lighting or speed). By enabling a user to control features and secondary settings of a device, a user is enabled with the ability to remotely control multiple features for several devices without being present at a location of those devices.

In certain embodiments, an updated status including the adjustment to a setting can be transmitted to the wireless network that include the device being adjusted. In the case when the computing device and the device affected by the adjustment are within the wireless network, the updated status can be received directly from the computing device. Upon determining that the computing device is remote, therefore, not located within the network, the updated status can be transmitted to the cloud network. The cloud network can store the updated status and communicate the updated status to the device.

In some embodiments, the graphical interface can be modified to indicate a change to a setting or an attribute (e.g., a desired setting) based on an adjustment from interaction with the interactive area. For example, a status of the tile may be dynamically displayed in the tile in response to the interaction. All or some of an appearance of the tile, an image in the tile, or an interactive element can be modified to indicate a new state or a change in the setting or the attribute of the device. In some embodiments, an appearance of the tile, an image in the tile, or an interactive element can be modified corresponding to a gradual change in a state or an attribute/setting of the device until a desired state or value of an attribute/setting is reached. In some embodiments, a modification to the graphical interface may be shown before the device has in fact been adjusted corresponding to the input from interaction with the interactive area. In some embodiments, the graphical interface may be further modified upon receiving a response (e.g., confirmation) that the device has been adjusted according to an adjustment based on interaction with the interactive area. The graphical interface may be further modified to indicate that the device has actually been adjusted based on the input from. For example, the graphical interface may be further modified to change an appearance of the device in the tile to indicate its adjusted state. The response can be received directly from the device or via the network, or the response can be received from any other device connected to the network.

According to at least one example, techniques may be provided that can be implemented by a computing device (e.g., an access device). The techniques can include a computer-implemented method, which includes determining that a device is connected to a network. The method further includes determining a current value of a setting related to operation of the device. The setting is adjustable between a plurality of values. The method includes generating a graphical interface. The graphical interface includes an interactive area corresponding to the device. The graphical interface indicates the current value of the setting. Interaction with the interactive area adjusts the current value of the setting. The method includes displaying the graphical interface. The method includes receiving input corresponding to an interaction with the interactive area. The input corresponds to an adjustment that indicates an amount to change the setting from the current value to an adjusted value. The method includes transmitting the adjustment. The operation of the device is controlled based on the transmitted adjustment. The method includes modifying the graphical interface based on the adjustment. The modified graphical interface indicates the adjusted value of the setting.

In some embodiments, a computing device may be provided that includes one or more data processors. The computing device may further include a non-transitory computer-readable storage medium containing instructions which when executed on the one or more data processors, cause the one or more processors to perform operations including determining that a device is connected to a network. The operations further include determining a current value of a setting related to operation of the device. The setting is adjustable between a plurality of values. The operations include generating a graphical interface. The graphical interface includes an interactive area corresponding to the device. The graphical interface indicates the current value of the setting. Interaction with the interactive area adjusts the current value of the setting. The operations include displaying the graphical interface. The operations include receiving input corresponding to an interaction with the interactive area. The input corresponds to an adjustment that indicates an amount to change the setting from the current value to an adjusted value. The operations include transmitting the adjustment. The operation of the device is controlled based on the transmitted adjustment. The operations include modifying the graphical interface based on the adjustment. The modified graphical interface indicates the adjusted value of the setting.

In some embodiments, a computer-program product tangibly embodied in a non-transitory machine-readable storage medium of a computing device may be provided. The computer-program product may include instructions configured to cause one or more data processors to determine that a device is connected to a network. The instructions are further configured to cause the one or more data processors to determine a current value of a setting related to operation of the device. The setting is adjustable between a plurality of values. The instructions are further configured to cause the one or more data processors to generate a graphical interface. The graphical interface includes an interactive area corresponding to the device. The graphical interface indicates the current value of the setting. Interaction with the interactive area adjusts the current value of the setting. The instructions are further configured to cause the one or more data processors to display the graphical interface. The instructions are further configured to cause the one or more data processors to receive input corresponding to an interaction with the interactive area. The input corresponds to an adjustment that indicates an amount to change the setting from the current value to an adjusted value. The instructions are further configured to cause the one or more data processors to transmit the adjustment. The operation of the device is controlled based on the transmitted adjustment. The instructions are further configured to cause the one or more data processors to modify the graphical interface based on the adjustment. The modified graphical interface indicates the adjusted value of the setting.

According to at least one example, techniques may be provided that can be implemented by a computing device (e.g., an access device). The techniques can include a computer-implemented method. The method includes determining a current status associated with a device on a network. The current status can indicate a current value of a setting related to operation of the device. The method further includes generating a graphical interface. The graphical interface can includes an interactive area corresponding to the device. The graphical interface can indicate the current status associated with the device. The method further includes displaying the graphical interface. The method further includes determining an updated status of the device using input received from the interactive area. The input can correspond to an adjustment of the current value to an adjusted value of the setting. The updated status can include the adjusted value. The method further includes transmitting the updated status. Operation of the device can be controlled using the updated status. The method further includes updating the graphical interface to display an indication of the updated status. The method further includes receiving a message indicating that the device received the updated status. The method further includes updating the graphical interface to display an indication that the updated status has been received.

In some embodiments, a computing device may be provided that includes one or more data processors. The computing device may further include a non-transitory computer-readable storage medium containing instructions which when executed on the one or more data processors, cause the one or more processors to perform operations. The operations can include determining a current status associated with a device on a network. The current status can indicate a current value of a setting related to operation of the device. The operations can include generating a graphical interface. The graphical interface can includes an interactive area corresponding to the device. The graphical interface can indicate the current status associated with the device. The operations can include displaying the graphical interface. The operations can include determining an updated status of the device using input received from the interactive area. The input can correspond to an adjustment of the current value to an adjusted value of the setting. The updated status can include the adjusted value. The operations can include transmitting the updated status. Operation of the device can be controlled using the updated status. The operations can include updating the graphical interface to display an indication of the updated status. The operations can include receiving a message indicating that the device received the updated status. The operations can include updating the graphical interface to display an indication that the updated status has been received.

In some embodiments, a computer-program product tangibly embodied in a non-transitory machine-readable storage medium of a computing device may be provided. The computer-program product may include instructions configured to cause one or more data processors to determine a current status associated with a device on a network. The current status can indicate a current value of a setting related to operation of the device. The instructions are further configured to cause the one or more data processors to generate a graphical interface. The graphical interface can includes an interactive area corresponding to the device. The graphical interface can indicate the current status associated with the device. The instructions are further configured to cause the one or more data processors to display the graphical interface. The instructions are further configured to cause the one or more data processors to determine an updated status of the device using input received from the interactive area. The input can correspond to an adjustment of the current value to an adjusted value of the setting. The updated status can include the adjusted value. The instructions are further configured to cause the one or more data processors to transmit the updated status. Operation of the device can be controlled using the updated status. The instructions are further configured to cause the one or more data processors to update the graphical interface to display an indication of the updated status. The instructions are further configured to cause the one or more data processors to receive a message indicating that the device received the updated status. The instructions are further configured to cause the one or more data processors to update the graphical interface to display an indication that the updated status has been received.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
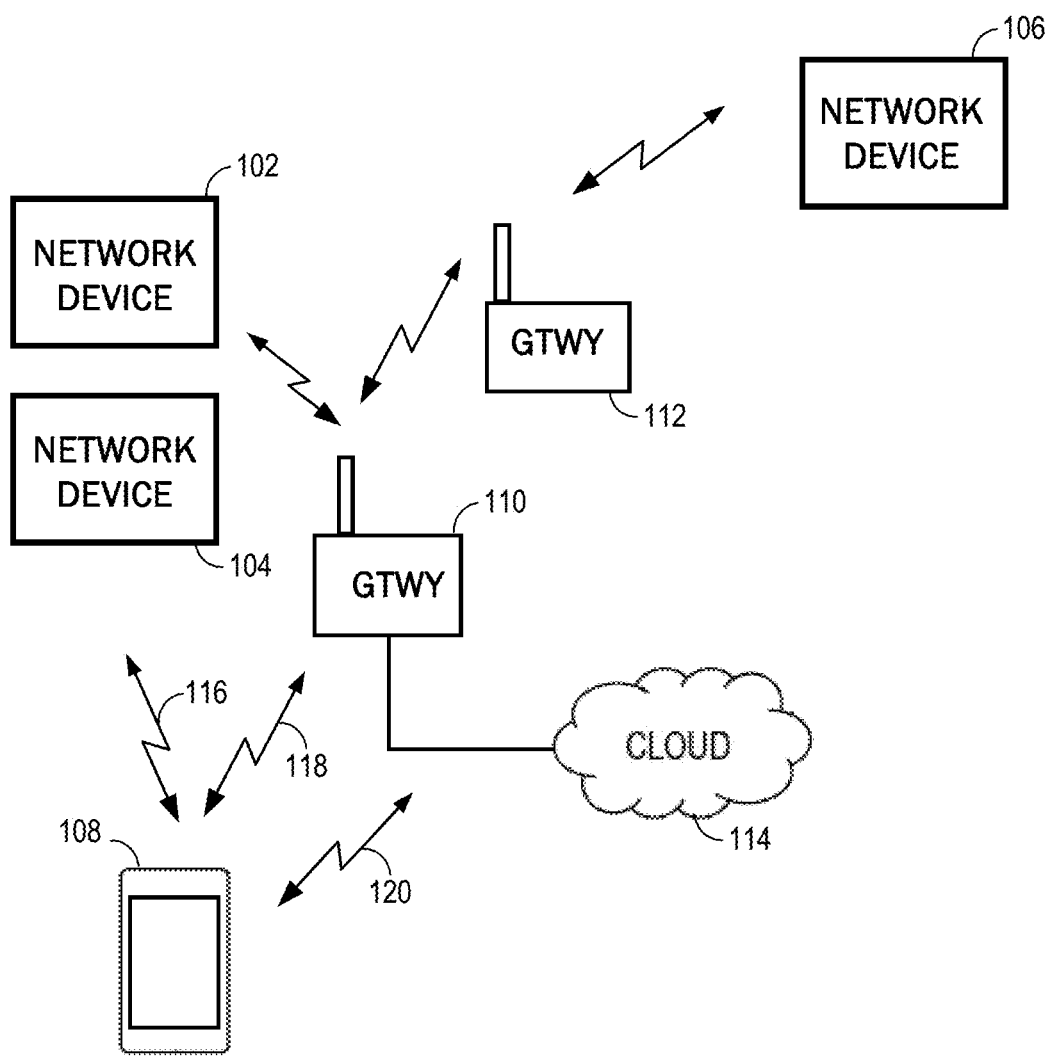
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A local area network may be set up to provide a user with access to various devices within the network. For example, a home automation network may include one or more network devices that provide a user with the ability to remotely configure or control one or more electronic devices (e.g., appliances) within a home. In some embodiments, the network devices may provide the user with the ability to remotely configure and control electronic devices in environments that can support a local area network. For example, the environments can include a home, an office, a business, or an automobile. The local area network may include one or more gateways that provide the user with access to the network devices. The one or more gateways may also provide the user and the network devices with access to one or more external networks, such as a cloud network, the Internet, and/or other wide area networks. One or more gateways in the local area network may be designated as a primary gateway that provides the local area network with access to an external network.

A local area network, such as a user's home local area network, can include multiple network devices that provide various functionalities. Network devices may be accessed and controlled using an access device and/or network gateways. The local area network can also extend outside the user's home and include network devices located outside the user's home. For instance, the local area network can include network devices such as exterior motion sensors, exterior lighting (i.e., porch lights, walkway lights, security lights, and the like), garage door openers, sprinkler systems, and other network devices that are exterior to the user's dwelling. It is desirable for a user to be able to access the network devices while located within the local area network and also while located remotely from the local area network.

For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e g, running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway. The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. The network device and the access device may then communicate with the cloud server using the network ID and the unique key generated for each device. Accordingly, the user may remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected.

Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

When a computing device, such as an access device, is used to access the local area network, the user may wish to be able to remotely control and/or configure the appliances connected to the network. It is desirable for a user to be able to control attributes related to operation of those devices regardless of whether the computing device is located within the local area network and is located remotely from the local area network. As explained herein, techniques are provided that enable a computing device to provide an interface (e.g., a graphical interface) that can enable one or more attributes and/or settings related to operation of a device on a local area network to be monitored and controlled. The techniques can enable a user of the access device to control operation of devices within a local area network without having to directly interact with the device itself.

In some embodiments, a computing device may initially determine the devices that are connected to a network. The determination may be made based on whether the computing device located within the wireless network of the devices or located remote from the wireless network. The computing device may have access to the wireless network based on its authentication with a logical network which enables access to the wireless network. In some embodiments, the computing device may perform local network discovery while within the wireless network to identify the devices connected to the network. Upon determining that the computing device is not located within the network, the computing device can determine the devices on the network by communicating with a cloud network to obtain information about devices on the network. The cloud network can store a status of devices on the network. The computing device can also determine devices on the network by accessing a local cache that can contain information it has previously received about devices known to exist on the network. The computing device can determine a status of the devices based on its local cache, information received from the cloud, or by direct communication with the devices within the local network. The computing device can access status information from the local cache to present in a display to a user.

In some embodiments, the computing device can execute an application that can cause the computing device to present the graphical interface containing information (e.g., status) about devices discovered in the network. The graphical interface can present a visual interface for each device accessible on the network. In some embodiments, the visual interface corresponding to a device can be rendered as a modular tile with one or more interactive elements or one or more interactive areas to control operation of the device. The visual interface corresponding to a device can provide a status of the device. These basic properties can include, for example, a default icon, a default name, interactive elements, and/or interactive areas for controlling one or more functionalities of a device. The functionalities can include, for example, powering the network device on and off. The functionalities can enable adjustment of adjustable attributes and/or settings for a device. For example, a device can be a light bulb, for which attributes or settings can be controlled via the tile.

In certain embodiments, the status or state of a device can be indicated in the graphical interface, such as within the tile, with text and/or graphically. The status of the device can change based on time (e.g., a period, an interval, or other time schedule). The status of a device may be any piece of information pertinent to that particular device. The status of a device may be any adjustable of changeable variable, attribute, or setting related to operation of that particular device. For example, the status of a device may include a state of the device itself (e.g., on or off). In certain embodiments, the status can include a value or other criteria for a setting or an attribute related to operation of a device. The setting or the attribute can be within a range of values. For example, the device can be a light bulb and the status can include a value corresponding to an amount of brightness (e.g., a percentage of total brightness) emitted by the light bulb when the light bulb is powered-on.

In certain embodiments, the tile or an interactive element in the tile, or an interactive area in the graphical interface or the tile, can enable interaction to dynamically adjust one or more settings and/or attributes related to operation of a device corresponding to the tile. In some embodiments, a status of the tile may be dynamically displayed in the tile in response to the interaction. All or some of an appearance of the tile, an image in the tile, or an interactive element can be modified to indicate a new state or a change in the setting or the attribute of the device. In some embodiments, an appearance of the tile, an image in the tile, or an interactive element can be modified corresponding to a gradual change in a state or an attribute/setting of the device until a desired state or value of an attribute/setting is reached. For example, a light bulb shown in the tile may be modified to include an animation, color, sound, information, etc. to indicate a change in the setting. In some embodiments, the light bulb may be displayed as being filled, dimmed, or brightened by an amount corresponding to the adjusted setting (e.g., brightness). In some embodiments, interaction with the graphical interface (e.g., a motion or a swipe of a finger on a display) can cause adjustment to be made for an attribute related to operation of the device.

In some embodiments, the tile can include or cause additional visual interfaces (e.g., menus or drawers) to be displayed within the graphical interface. The visual interfaces can enable control of settings and/or attributes related to operation of a device (or multiple devices in a group) corresponding to the tile. For example, a tile can include a drawer that displays options for secondary functionalities in response to a selection made for a primary functionality (e.g., controlling a power state) for a device. In certain embodiments, the drawer can display secondary settings, including a default, implied secondary setting for a device, wherein the implied secondary setting is tied to a setting selected for a primary function. The secondary settings can affect the operation of the device and can be related to scheduling operation of the device (i.e., setting on/off times), selecting auto off timeouts or thresholds, selecting settings for putting the device into a standby, hibernate, or sleep mode, and/or controlling adjustable features (e.g., lighting or speed). By enabling a user to control features and secondary settings of a device, a user is enabled with the ability to remotely control multiple features for several devices without being present at a location of those devices.

In certain embodiments, an updated status including the adjustment of a setting can be transmitted to the wireless network that includes the device being adjusted. In the case when the computing device and the device affected by the adjustment are within the wireless network, the updated status can be received directly from the computing device. Upon determining that the computing device is remote (e.g., not located within the network), the updated status can be transmitted to the cloud network. The cloud network can then store the updated status and communicate the updated status to the device.

In some embodiments, the graphical interface can be modified to indicate a change to a setting or an attribute (e.g., a desired setting) based on an adjustment from interaction with the interactive area. For example, a status of the tile may be dynamically displayed in the tile in response to the interaction. All or some of an appearance of the tile, an image in the tile, or an interactive element can be modified to indicate a new state or a change in the setting or the attribute of the device. In some embodiments, an appearance of the tile, an image in the tile, or an interactive element can be modified corresponding to a gradual change in a state or an attribute/setting of the device until a desired state or value of an attribute/setting is reached. In some embodiments, a modification to the graphical interface may be shown before the device has in fact been adjusted corresponding to the input from interaction with the interactive area. In some embodiments, the graphical interface may be further modified upon receiving a response (e.g., confirmation) that the device has been adjusted according to an adjustment based on interaction with the interactive area. The graphical interface may be further modified to indicate that the device has actually been adjusted based on the input from interaction with the interactive area. For example, the graphical interface may be further modified to change an appearance of the device in the tile to indicate its adjusted state. The response can be received directly from the device or via the network, or the response can be received from any other device connected to the network.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, an IoT device does not include a cellular or other broadband network transceiver radio or interface, and thus may not be configured to directly communicate with a broadband network. In some embodiments, an IoT device may include a cellular or broadband network transceiver radio, and may be configured to communicate with a broadband network using the broadband network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or the like), or the like. In some embodiments, the access device 108 may include a cellular or broadband network transceiver radio or interface, and may be configured to communicate with a broadband network using the broadband network transceiver radio. In some embodiments, the access device 108 may not include a cellular or broadband network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Upon being powered on or reset, the network devices 102, 104, 106 may be registered with the cloud network 114 and associated with a logical network within the local area network 100. In certain embodiments, a process 200 for registering one or more network devices, such as the network devices 102, 104, 106 illustrated in FIG. 1 may be implemented. When multiple network devices 102, 104, 106 and gateways 110, 112 are included within a local area network, the network devices and/or gateways may be installed at different times, resulting in the techniques described with respect to the process 200 of possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

The process 200 may include a network device detecting one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. The process 200 may include the network device obtaining credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The process 200 may include the network device sending the gateway credentials to the cloud network. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

Once the unique IDs are received by the server, the server may register each network device and determine a visual interface module for each network device. For example, the server may register the network device 102 as a first network device. During the registration process, the server may determine or generate a first interface module ID for identifying a visual interface module suitable for controlling the first network device. As noted above, one of ordinary skill in the art will appreciate that any number of network devices may be present within the local area network, and thus that any number of network devices may be discovered and registered for the local area network.

In some embodiments, a modular visual interface framework may be utilized to dynamically and implicitly provide visual interface modules to an access device 108 so that the access device 108 can be used to control network devices within a network without having to install a new application or a version of an application for each network device. The visual interface modules can enable a user of the access device 108 to remotely control network devices within a network without having to physically interface with the network device. In certain embodiments, an application installed on the access device 108 can have a graphical interface, and the application can be configured to execute one or more visual interface modules usable to control respective network devices in a local area network. The visual interface modules, when executed by an application, can render a visual interface in the graphical interface to enable control of operation of the network device. In some embodiments, the visual interface module can be specific to a given network device.

The visual interface rendered for a visual interface module can be a modular tile that includes information identifying a respective network device and includes interactive areas or interactive elements for controlling and/or monitoring the network device on a network. The visual interface can provide information about a status of the network device corresponding to the tile. The status of a network device may be any changeable variable of that particular network device. For example, the status of a network device may include a state of the network device itself (e.g., on or off) or how the network device is situated within the network with respect to the other network and other devices throughout the network. In certain embodiments, the status can include a value, a state, or other unit of measure corresponding to a setting or an attribute related to operation of a device. The setting or the attribute can be adjustable within a range of values or between different states. For example, the device can be a light bulb and the status can include a value corresponding to brightness (e.g., a percentage of total brightness) emitted by the light bulb when the light bulb is powered-on.

The visual interface can include one or more interactive elements or interactive areas to control one or more settings and/or attributes related to operation of the network device corresponding to the visual interface. The settings and/or attributes can correspond to functionalities or features of the network device. The functionalities can include, for example, powering the network device on and off, or adjusting a setting or an attribute of the network device. The visual interface can be updated to reflect the status of the network device with respect to the adjustment of one or more attributes and/or settings. Operation and implementation of the modular visual interface framework is described below with reference to FIG. 2. In particular, FIGS. 5-11 show examples of visual interfaces that enable a user to control attributes and/or settings related to operation of network devices controllable via a computing device.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network. Also such embodiments where the server may determine that the access device 108 has already been registered with another network device, the server may have used a unique ID for the previously discovered network device 102 to determine a first interface module suitable for controlling the network device 102. Further in such embodiments, the server may use another unique ID for the network device 104 to identify a second interface module suitable for controlling network device 104.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier. The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

A record or profile may then be created in a data store at the server for associating each network device with a corresponding, known interface module so that the interface module can be provided to the access device. For example, the server of the cloud network 114 may associate the first network device 102 with a first interface module. Similarly, the server may associate the second network device 104 with a second interface module. In some embodiments, the server performs the association by generating and storing a record including the unique ID of the network device (e.g., MAC address or serial number of a network device), a unique ID of an interface module suitable to control the network device, and/or any other information relevant to the network device and/or the interface module. For example, the server may store a first record at a first memory space (e.g., in Flash, DRAM, a data store, a database, or the like) with the unique ID of the network device 102 and the unique ID of an interface module for monitoring and controlling the network device 102. The server may also store a second record at a second memory space along with the unique ID of the network device 106 and the unique ID of an interface module for monitoring and controlling the network device 106. The technique used to store records for associating each network device with a corresponding interface module may be dependent on a type of database that is included in the cloud network 114. For example, different databases may have different proprietary mechanisms for creating unique identifiers. The unique identifiers for each interface module may be generated using database specific technique. For example, a MySQL technique may be used to generate the unique IDs for interface modules. Each unique ID for interface modules may include a universally unique identifier (UUID) or a globally unique identifier (GUID).

The process 200 may include the network device receiving the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server. The server may also associate the network device 104 with a known interface module. The server may also generate a record in a data store of interfaces for the network device 104. The access device 108 may receive the interface module for controlling the network device 104 from the server, and then store the interface module in a local cache.

The process 200 may include the network device sending the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may then process the signature in order to authenticate each device, as described below. The network device and access device may use different techniques to generate a signature.

A network device may generate a signature using its uniquely generated security key. For example, the signature may be expressed as: Authorization=MacAddress":"Signature": "ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as Expiration-me=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=niqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

As previously described, the access device, when located within range of the local area network, may be authenticated using accountless authentication that is based on the access device's authentication with the logical network. For example, if the access device has authorized access to the logical network (e.g., a WiFi network provided by a gateway), the network devices paired with that logical network may allow the access device to connect with them without requiring a network device login. Accordingly, the network device may perform accountless authentication of access devices that have authorization to access the logical network without requiring a user to provide login credentials for the network devices. While located remotely, the access device may also be authenticated to access the network devices via the cloud network using an accountless authentication process. For example, the network ID and the access device's unique security key may be used to allow the access device to communicate with the network devices via the cloud network (e.g., by generating a signature as described above).

When the access device 108 is located within range of both gateways 110, 112 in the local area network 100, the access device 108 does not encounter any issues when attempting to access any of the network devices 102, 104, 106. For example, the access device 108 may perform UPnP discovery and may list all if the network devices 102, 104, 106 that have responded to the discovery request regardless of which network ID the network devices 102, 104, 106 have. Accordingly, the existence of the first and second logical networks with first and second network IDs does not lead to any issues when the access device 108 is located within the local area network 100. However, when the user is located remotely, the access device 108 may only be associated with one logical network at a time. For example, the access device 108, while located remotely from the local area network 100, may query the cloud server with a known network ID (e.g., the first or second network ID). In response, the server will only return the network devices associated with that network ID. As a result, the user will not be able to see all network devices within the user's local area network 100.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated in the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered-on. In yet another example, the device can be a fan and the status can include a value corresponding to a speed of the fan on a scale of 0 to 100 when the fan is powered-on.

As described above, upon being powered on or reset, the-network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each network device, or individual storage tables for each local area network or other subset of its network devices/networks. In one embodiment, a change in status may prompt the-network device to push its change in in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the network devices on the network 100. In other embodiments, one network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if network devices 102 and 104 were to each turn on and communicate their statuses to cloud network 114, cloud network 114 may analyze the status of network devices 102 and 104 and communicate to network devices 102 and 104 that they are each connected to the same local area network 100.

Figure 2:
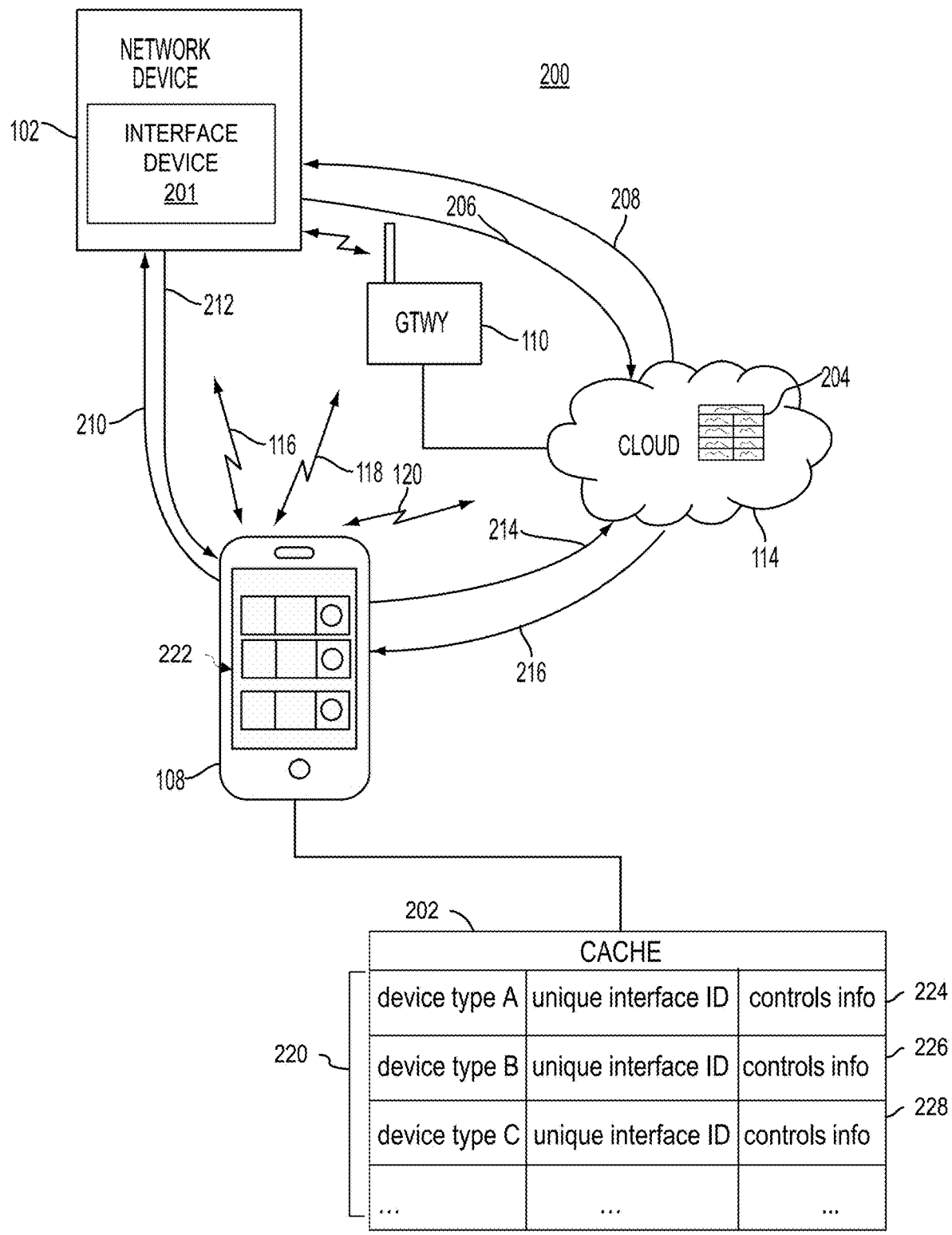
FIG. 2 is a flowchart illustrating an embodiment of a process for registering one or more network devices, in accordance with some embodiments.

FIG. 2 illustrates an embodiment of a process 200 for providing a visual interface module for controlling a network device. As shown, the process 200 may be performed by one or more computing devices, such as network device 102, a server associated with cloud network 114, or access device 108 described above with reference to FIG. 1. In some embodiments, the network device 102 is associated with a home automation network, such as the local area network 100 described above with respect to FIG. 1. Process 200 is illustrated as a data flow diagram, the operation of which represents operations that can be implemented in hardware, computer instructions, or a combination thereof. Gateway 110 is connected to cloud network 114, and allows network device 102 to connect to the cloud network 114, the Internet, or other external networks via gateway 110. In some embodiments, the network device 102 may be a home automation network device that allows a user to access, monitor, control, and/or configure various home appliances located within the user's home, such as a television, radio, light bulb, microwave, iron, fan, space heater, sensor, and/or the like. In some embodiments, the user can monitor and control network devices by interacting with a visual interface rendered by the gateway 110 (i.e., a web page for gateway 110), a visual interface rendered on display 222 of the access device 108, or a visual interface rendered by the network device 102.

In an embodiment, an application may be run on the access device 108. The application may cause the access device 108 to present a display 222 with a modular visual interface for each network device accessible on the local area network 100. When the application is run on the access device 108, the access device 108 can access a cache 202.

The cache 202 can be a local cache located in onboard storage of the access device 108. The cache 202 can contain a known interface list 220 with records 224, 226 and 228 including interface information for different, known types of network devices. As shown, each of records 224, 226 and 228 can include a device type, a unique interface module ID, and controls information. The known interface list 220 can include a record for each device known by the access device 108 to exist on the local area network 100. When the application is run on the access device 108, the access device 108 can access the known interfaces 220 in the cache 202 to present the display 222, which lists modular interfaces for each network device on the local area network 100. In an example, the display 222 can include a modular tile for each connected network device having an interface in the known interface list 220. Exemplary communications used to populate cache 202 are described in the following paragraphs.

The process 200 can include utilizing communication 206 to register a visual interface module for a network device 102 with a server of cloud network 114. For simplicity, communication 206 is shown as a direct communication between network device 102 and cloud network 114. However, it is to be understood that in an embodiment, communication 206 can be sent from a manufacturer of network device 102 to cloud network 114. In an additional or alternative embodiment, communication 206 is sent from third party interface developer to cloud network 114. For example, a third party developer of a visual interface module for network device 102 may initiate communication 206 to cloud network 114. In the example of FIG. 2, communication 206 includes registration information for the network device 102. For example, communication 206 can include a unique device ID for network device 102. In some embodiments, the registration information may identify one or more capabilities of network device 102. The registration information can include a unique identifier for the network device, a default name of the network device, one or more capabilities of the network device, and one or more discovery mechanisms for the network device. In one example, communication 206 can include a resource bundle corresponding to network device 102. The resource bundle can be embodied as a structured folder structure whose contents define all visual and interactive elements/areas in a tile. For example, a resource bundle can be a zip file sent from a device manufacturer or a third party developer that is submitted or uploaded to cloud network 114. The resource bundle includes a unique device ID and files defining graphical content of a visual interface module. The graphical content can include definitions of interactive elements/areas for the interface module. The resource bundle can include templates defining interactive control states for each of the interactive elements, language translations for tile text, any menus for the tile, and graphical content of the menus. For example, the resource bundle can define templates, text, and graphical content using a markup language, such as HTML5.

At 206, the process 200 includes transmitting an indication that network device 102 is associated with the network. For example, network device 102 may transmit the indication to the server of the cloud network 114. In some embodiments, transmitting may include transmitting a unique identifier (ID) for the network device 102. For example, the network device 102 may send a communication to the server indicating a unique interface module ID for the network device 102. In such embodiments, the server may then determine that a match between the unique interface module ID and a known interface exists. The cloud network 114 can include a data store 204 of known interfaces. The access device 108 can download a visual interface module identified in data store 204 from the cloud network 114, which can be used to render a modular interface within display 222. In an embodiment, data store 204 can be a tile database where each record in the database is uniquely identified by a tile ID.

Cloud network 114 can use the unique device ID to determine an interface module for network device 102. As shown in FIG. 2, cloud network 114 can access a data store 204 of visual interface modules. A plurality of uniquely identified interface modules can be stored in data store 204. For example, each interface module in data store 204 can be associated with a unique interface module ID. In an embodiment, data store 204 is a database configured to store modular tiles for a plurality of network devices, with each of the stored modular tiles being identified by a unique tile ID. For instance, the network device 102 having a unique device identifier may be matched with an existing interface module based on comparing information received from the network device 102 with information stored in data store 204. In cases where an existing interface module for network device 102 is not found in data store 204, cloud network 114 can use information in a resource bundle for the network device 102 to generate an interface module, where the resource bundle is provided as part of a registration process for a given network device. The generated interface module can then be stored in data store 204 and assigned a unique interface module ID. In some embodiments, information in the resource bundle can be used to update an existing interface module stored in data store 204. After determining the interface module for network device 102, cloud network 114 sends communication 208 to network device 102 in order to provide a unique interface module ID to the network device 102. In one embodiment, communication 208 can include a unique tile ID corresponding to a modular tile for network device 102 that is stored in data store 204. In some embodiments, communication 208 includes a unique tile ID corresponding to a modular tile defined for network device 102. Upon receiving communication 208 with the unique interface module ID (i.e., a unique tile ID), the network device 102 can store the unique interface module ID. In one embodiment, for example, the unique interface module ID can be stored by an interface device 201 of the network device 102 that is configured to provide the interface module ID to an access device or gateway. In an embodiment, the interface device 201 is implemented as a 'smart module' in hardware and firmware, such as, for example, a system on a chip (SOC) integrated into the network device 102.

The interface device 201 can include flash memory and dynamic random access memory (DRAM). The flash memory may be used to store instructions or code relating to an operating system, one or more applications, and any firmware. The flash memory may include nonvolatile memory so that any firmware or other program can be can updated. In the event the interface device 201 loses power, information stored in the flash memory may be retained. The DRAM of the interface device 201 may store various other types of information needed to run the interface device 201, such as all runtime instructions or code. The flash memory or DRAM or a combination thereof may include all instructions necessary to communicate with network device 102.

The process 200 can include sending, from the access device 108, intra-network communication 210 including a query, to the network device 102. The query can be a request for information such as a query for capabilities, a request for an identity of the network device 102, and/or a request for a unique interface module ID. For example, communication 210 can be sent from access device 108 to network device 102 to query network device 102 about its identity. In response to the query sent from access device 108, the process 200 can include receiving intra-network communication 212 at the access device 108 with device information for the network device 102. According to an embodiment, in response to the query, the network device 102 can send communication 212 to inform the access device 108 of the identity and/or capabilities of the network device 102. For instance, in response to receiving the query, the network device 102 may send communications 212 to the access device 108 with at least a unique interface module ID. The process 200 can include utilizing intra-network device communications 210 and 212 as part of a discovery process for the network device 102. For example, when the network device 102 is initially connected to the network, it and access device 108 can automatically exchange communications 210 and 212 to provide the access device 108 with information that can be used to determine a basic, default visual interface stored in cache 202.

Within the context of a modular tile framework, embodiments can dynamically render a functional user interface without having to download the appropriate interface template from a remote server, such as a server associated with the cloud network 114, in order to control a newly discovered network device. These embodiments can be used in cases where a connection to the Internet or the cloud network 114 is unavailable or unreliable, and immediate use of a newly discovered network device is desired. In this case, an application on the access device 108 or a stationary device such as gateway 110 could, based on certain information received from the network device 102, dynamically render a functional interface for immediate use. Such a functional interface may not be the ideal, visually optimized, interface that is downloadable from the cloud network 114. However, such a functional interface will suffice until the application is able connect to the Internet and/or the cloud network 114 and subsequently download the appropriate and visually optimized interface module for the network device 102.

In some embodiments, communication 212 may be received when the network device 102 is rebooted (e.g., powered on, reset or restored to default settings, or the like). For example, when the network device 102 is rebooted, it may broadcast one or more messages on the local area network 100 to discover whether there are any access devices in the local area network 100. For example, communication 212 may be broadcast according to a UPnP protocol during a discovery process. The network device 102 may receive communications 210 from access device 108 indicating that it is located within the local area network 100 and interrogating network device 102 about its functionalities. That is, after receiving a broadcast message from network device 102, access device 108 may then query network device 102 by sending communication 210 in order to receive the communication 212 including information about the network device.

After receiving communication 212, if the access device 108 can access the cloud network 114, it sends a communication 214 to the cloud network 114 as a request for an interface module for the network device 102. Communication 214 is described in further detail below. Otherwise, if the access device 108 cannot access the cloud network 114, the access device 108 looks up the unique interface module ID received from the network device 102 in cache 202. As discussed above, cache 202 can be a local cache stored on the access device 108. Basic properties for known interfaces can be stored in cache 202 as a device type and controls information. These basic properties can include, for example, a default icon, a default name, and interactive elements or interactive areas for controlling one or more primary functionalities of a network device. The primary functionalities can include, for example, powering the network device on and off. The basic properties can also include controls information for secondary functionalities.

In some embodiments, when the access device is connected to the cloud network 114, the access device 108 sends communication 214 to query the cloud network 114 about network device 102. The communication 214 can include at least the unique interface module ID for the network device 102. At this point, the cloud network 114 can compare the unique interface module ID of the network device 102 to known interface module IDs stored in data store 204 in order to determine that there is a match between the unique interface module ID sent with communication 214 and a known interface module. If the cloud network 114 finds an interface module in its data store 204, it transmits the interface module to the access device 108 via communication 216. For example, if the access device 108 is currently using a default interface module for network device 102 that was determined based on exchanging communications 210 and 212, and then subsequently is able to connect to the cloud network 114, communications 214 and 216 between the access device 108 and the cloud network 114 can be used to obtain an updated interface module for the network device 102.

Upon receiving communication 216 from the cloud network 114, the access device 108 populates a record in cache 202 corresponding to the network device 102 with device type and controls information received via communication 216. That is, when the access device is remote from the local area network 100, it can exchange communications 214 and 216 with the cloud network 114 to receive an interface module for a network device. Information received via communications 216 can be used to populate records of cache 202. Records in cache 202 can be updated using modular interfaces received via communication 216. In additional or alternative embodiments, new records can be created in cache 202 when communication 216 includes a modular interface for a newly discovered network device.

Records 224, 226, 228 in cache 202 store device types, unique interface module IDs, and controls information for known network devices. The access device 108 uses the records in cache 202 to render visual interfaces in the display 222. For example, the display 222 can include a navigable list of modular tiles corresponding to network devices in the local area network 100.

Display 222 can also include an indicator representing a state of network device 102. In embodiments, communications 212 and/or 214 can include a last known state of the network device 102 and/or historical data associated with the network device 102. In one embodiment, such state information can be based on information received via communication 212 from the network device 102 when the access device 108 is connected to the local area network 100. In this way, display 222 of the access device 108 can reflect a current state and historical data for the network device 102 when the access device is not connected to the local area network 100. In additional or alternative embodiments, the state information can be based on information received via communication 216 from the cloud network 114 when the access device 108 is connected to the cloud network 114. Using the state information, an interface module or tile for the network device 102 within display 222 can indicate an 'on' or 'off' state for the network device 102 when the network device is powered on or off.

Figure 3:
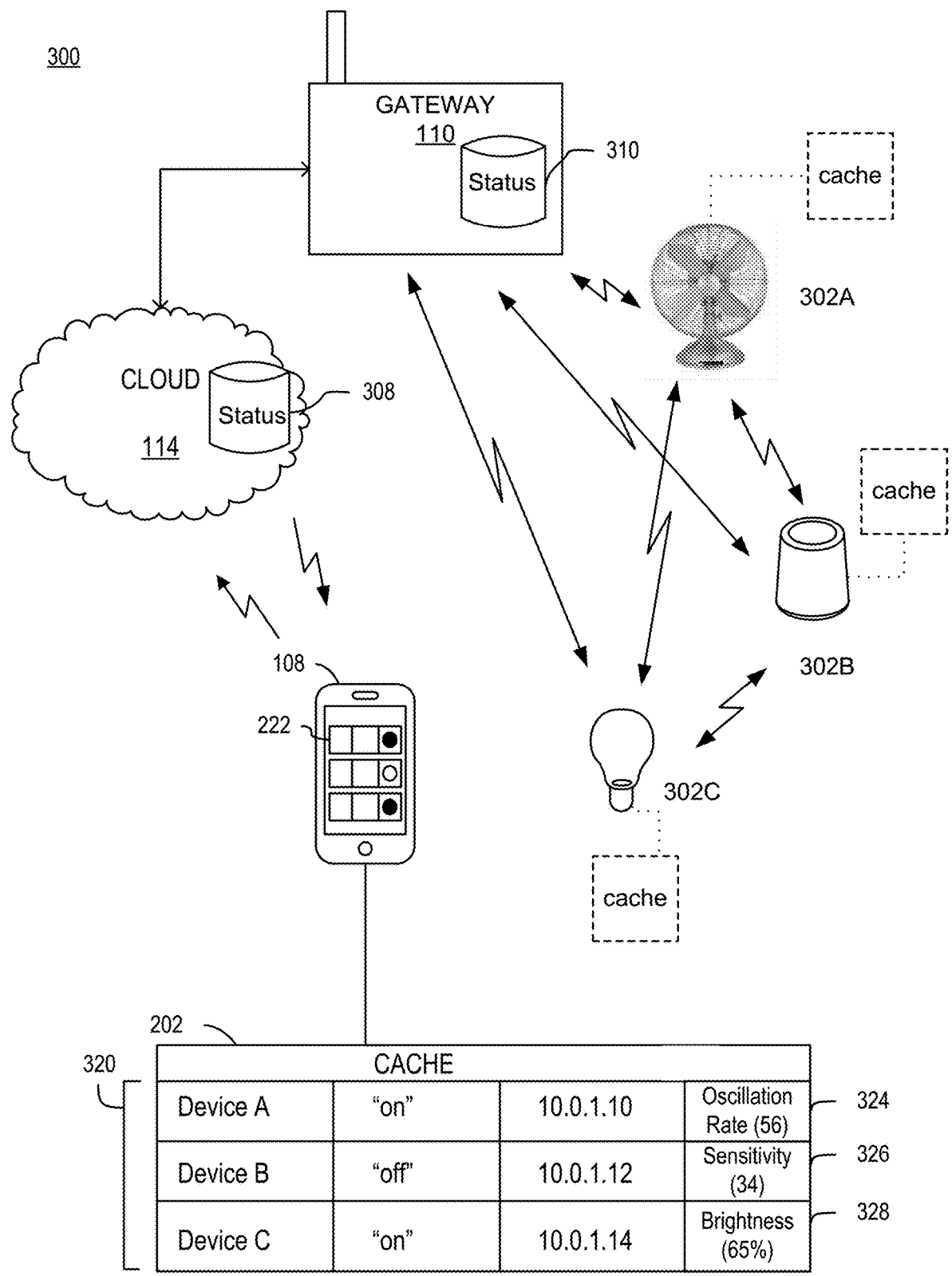
FIG. 3 is an illustration of an example of a network environment, in accordance with some embodiments.

FIG. 3 is an example of a wireless network 300 according to some embodiments of the present invention. The network 300 can be included or implemented in the network 100, the network 200, or a combination thereof. Specifically, the network 300 can be a wireless local area network enabling an access device to communicate with devices to control adjustment of attributes related to operation of the devices. The network 300 may have other components than those depicted. Further, the embodiment shown in the figure is only one example of a local area network that may incorporate an embodiment of the invention. In some other embodiments, local area network 300 may have more or fewer components than shown in the figure, may combine two or more components, or may have a different configuration or arrangement of components. The embodiments described herein can be used with various types of devices and varying numbers devices.

The network 300 can include a device 302A, a device 302B, and device 302C. In some embodiments, each of the devices 302A, 302B, and 302C may include a home automation network device that allow a user to access, control, and/or configure various appliances, such as a television, radio, light, a fan, a humidifier, a sensor, microwave, iron, and/or the like. For example, device 302A may be configured to enable control of a fan, device 302B may be configured to enable control of a motion sensor, and device 302C may be configured to enable control of a light bulb.

The network 300 can enable user to monitor and/or control operation of the devices 302A-302C. For example, the user can monitor and control devices by interacting with a visual interface of the gateway 110 (i.e., a web page for gateway 110) and/or a visual interface rendered on display 222 of the access device 108. In some embodiments, an application may be run on the access device 108. The application may cause the access device 108 to present a graphical interface (e.g., the display 222) that includes a visual interface for each device accessible on the network 300.

The visual interface corresponding to a device can provide a "status" of the device. In certain embodiments, the status or state of a device can be indicated within the tile with text and/or graphically. The status of the device can change based on time (e.g., a period, an interval, or other time schedule). The status of a device may be any piece of information pertinent to that particular device. The status of a device may be any changeable variable of that particular device. For example, the status of a device may include a state of the device itself (e.g., on or off) or how the device is situated within the network with respect to the other network and other devices throughout the network. For example, the status of a device may refer to the device's proximity to another device and/or its ability to communicate with another device because of the relative signal strength between the two devices. In certain embodiments, the status can include a value or some other information indicating a unit of measure for a setting or an attribute related to operation of a device. The setting or the attribute can be adjustable within a range of values. For example, the device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered-on. In yet another example, the device can be a fan and the status can include a value corresponding to a speed of the fan on a scale of 0 to 100 when the fan is powered-on.

Figure 4:
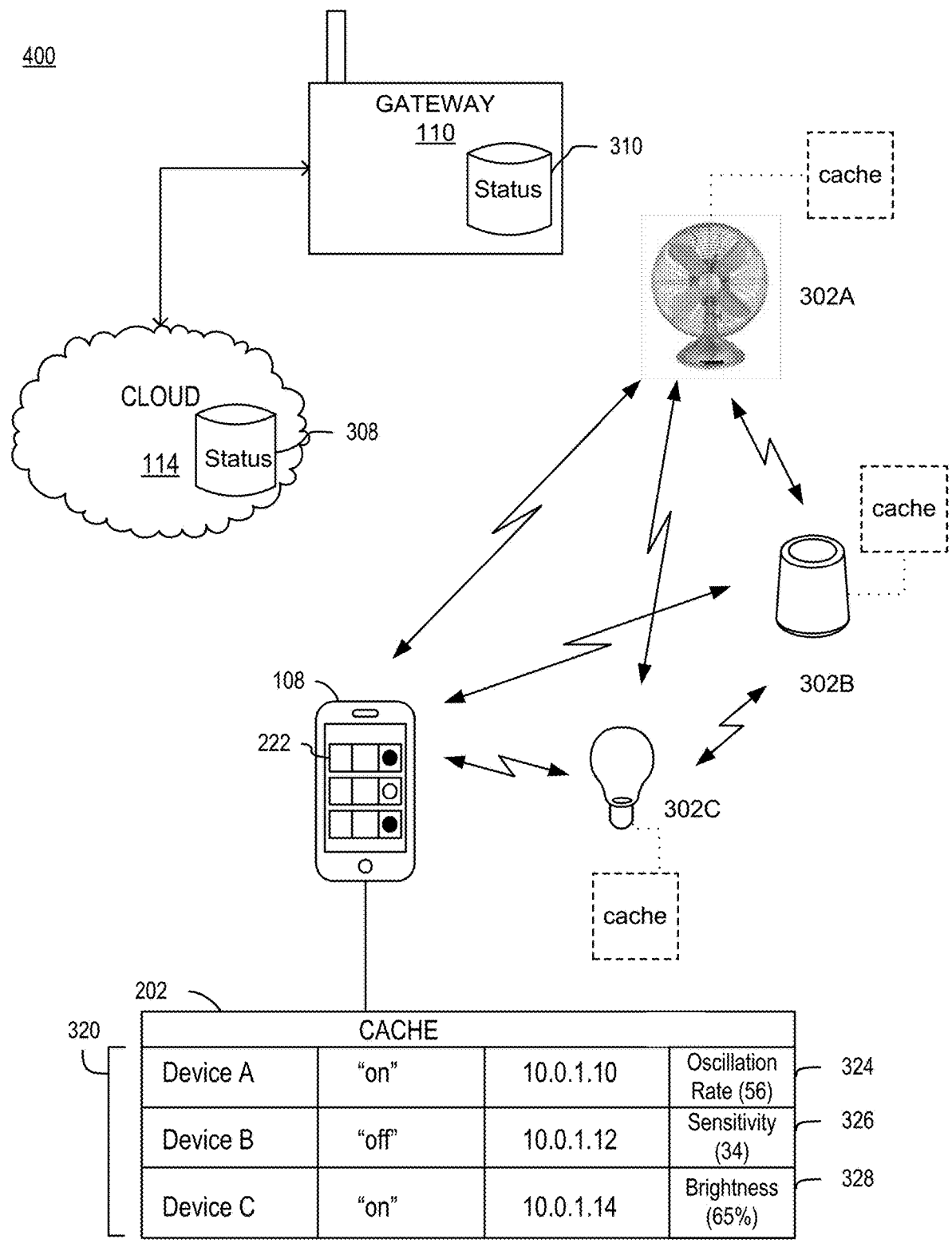
FIG. 4 is an illustration of an example of a network environment, in accordance with some embodiments.

An application operating on the access device 108 can access the cache 202 to obtain information to display the visual interface for each device 302A-302C registered within the network 300. FIG. 4 also illustrates that each of the devices 302A-302C may include a storage device, such as a cache, for storing data, including data regarding its own status and data regarding statuses received from the other devices within the network 300.

In some embodiments, the access device 108 can first determine whether the access device 108 is on the local area network 300 or another network. In some embodiments, the access device 108 may only perform local network discovery when the access device 108 is on the local area network 300. For example, access device 108 may, after being powered up, broadcast/send its status to one or more of the devices 302A-302C. The devices 302A-302C may store the status data received from access device 108 until the next time access device 108 updates its status by sending new/updated status data. Cache may be used for storage within the devices 302A-302C, the network 300, and/or the access device 108 within the local area network 400 so that each of the devices 302A-302C may be able to quickly retrieve the data it needs from storage. Although a caching device may be used to store such data within the network and/or access devices within the local area network 300, other types of storage may be used.

As explained with reference to FIG. 2, the cache 202 can contain a known interface list 220 including interface information for different, known types of devices. As explained earlier, the known interface list 220 can include a record for each device known by the access device 108 to exist on the network 300. When an application is run on the access device 108, the access device 108 can access the known interfaces 240 in the cache 202 to present the display 222. The display 222 can present one or more visual interfaces, each corresponding to a device known to exist on the network 300. Each visual interface can be generated based on a visual interface module corresponding to each device on the network 300. In an example, the display 222 can include a visual interface (e.g., a module tile) for each device in the network 300 having an interface in the known interface list 220.

The cache 202 can also contain a known device list 320 with a Device A 302A last known address 324, a Device B 302B last known address 326, and a Device C 302C last known address 328. The known device list 320 can list each device known by the access device 108 to exist on the local area network 300. Devices 302A-302C can be present on the known device list 220 because the access device 108 or another device capable of updating the cache 202 of the access device 108 has previously discovered devices 302A-302C.

In addition to address information, the cache 202 can contain known status information 204 about each device in the known device list 320. When the application is run on the access device 108, the access device 108 can access the known status information in the cache 202 to present a status display 222. The access device 108 can populate each tile with an indicator representing the respective known status information for each device in the known device list 320. For example, the status display 222 can include an indicator representing an "on" state for Device A 302A and Device C 302C, and an indicator representing "off" for Device B 302B. The status display 222 can include an indicator of one or more attributes, one or more settings, or a combination thereof related to operation of each device in the network 300. For example, the status display can include a speed of a fan (e.g., a fan speed of 56 in a range of values between 0 and 100) of the device 302A (e.g., a fan), a value of sensitivity of a sensor (e.g., a value of 34 in a range of values 0-100) for the device 302B (e.g., a motion sensor), and a value of brightness (e.g., 65 percent brightness) for the device 302C (e.g., a light bulb). Although shown as having a single indicator for an attribute or a setting related to operation of a device, the status display 222 can present a plurality of indicators corresponding to different attributes and/or settings related to operation of a device.

In some embodiments, the cache 202 can include other information about a device. The other information can indicate a device's firmware version, last known firmware update status, connectivity to cloud status, registration status (e.g., whether the device has a key or not), and other such information. The cache 202 can include information that could be used for troubleshooting. In embodiments described below, the access device 108 can access status information from another other device on the network 300 and can use that information to update its own cache 202, update the status display 222, and/or pass the information to the cloud network 114 and/or the gateway 110 for trouble shooting and/or storage.

Upon being powered on or reset, the devices 302A, 302B, and 302C may be registered with the cloud network 114 and associated with a logical network within the local area network 300. Similarly, upon being powered/switched off or otherwise being disconnected from the network, the status of the device 302 would be known and stored by cache associated with the network 300. For example, cloud network 114 may include storage (e.g. cache 308) that stores the status of the devices within each local area network it is connected to and/or provides access to. In another example, the gateway 110 may include storage (e.g., cache 310) that stores the status of the devices within each local area network it is connected to and/or provides access to. More specifically, the status stored in the cache 308 and/or the cache 310 may include a status table which indicates the current status of each device (as of its last communication with each device). A status table can include all statuses of each device, or individual storage tables for each local area network or other subset of its devices/networks. In one embodiment, a change in status may prompt the device to push its change in in status to the cloud network 114 for storage or updating of the cloud's stored status table. In another embodiment, cloud network 114 and/or gateway 110 may continuously (or periodically) communicate with each device to check to see if its status has changed.

In some embodiments, the access device 108 may, upon connecting to the local area network 300, check the status of the devices on the network. In other embodiments, one device may check the status of one or more of the other devices on the network. The access device 108 or the device 302A-302C may seek to check the status of another device or access device for various reasons, including to display such status(es) to a user on a display or otherwise, to check whether that device belongs to the same network, to synchronize or coordinate any scheduled executions, to update an attribute based on adjustment received among others. For example, a device or user may desire to check various statuses on the device, such as power level, timestamped activity history (e.g. temperature for a thermostat, motion for a motion detector, etc.), how long it has been active/turned on, an attributes for operation of the device (e.g., a brightness of a lamp, a speed of a fan, or a sensitivity of a sensor, etc.), among many others.

In some embodiments, a device, such as the access device 108 or the gateway 110, connected to the network 300 can communicate an updated status of a device, such as the device 302A, the device 302B or the device 302C. The updated status can be communicated via the network 300 and can include an adjustment that affects a status of the device. The adjustment can include an amount of change to one or more attributes, one or more settings, or a combination thereof related to operation of the device connected to the network. As described earlier and further below with reference to FIGS. 5-11, the access device 108 or the gateway 110 can present a graphical interface that can receive input corresponding to an adjustment to a status of a device. In some embodiments, the updated status of the device communicated to the network 300 can be received by a device to which the updated status applies, or can be received by the gateway 110, the cloud network 110, or any other device in communication with the network. If the device cannot directly receive the updated status, it can also receive the updated status from the cloud network 114, the gateway 110, or the other devices in the network. In some embodiments, the device can communicate its updated status to the network which can indicate whether the status has been updated. The updated status can be received by the access device 108 or any other device in the network 300. In some embodiments where the access device 108 is not located within the network, the access device 108 may not immediately receive the updated status. The updated status can be stored by the cloud network 114 or the gateway 110 for communication to the access device 108. The status of the device can indicate whether an adjustment was made based on an adjustment in a setting or an attribute transmitted by the access device 108. Alternatively, or additional, the access device 108 can receive, from any other device connected to the network, a status update indicating whether the adjustment was in fact made at a device.

A device seeking to check the status of any other device on the network may communicate with the cloud network 114, to which all devices on the network are connected either directly or indirectly. Since the cloud network 114 and/or the gateway 110 can store an updated table/list of the statuses of each of the devices 302A-302C within the requesting network's local area network, the cloud network 114 and/or gateway 110 may communicate such status data to the devices 302A-302C and the access device 108. For example, if device 302A and 302C were to each turn on and communicate their statuses to cloud network 114, cloud network 114 may analyze the status of devices 302A and 302C and communicate to devices 302A and 302C that they are each connected to the same local area network.

FIG. 4 illustrates an example of a wireless network 400, according to embodiments of the present invention. Specifically, the network 400 can be a wireless local area network enabling an access device to communicate with devices to control adjustment of attributes related to operation of the devices. Similar to the network 300 in FIG. 3, the network 400 includes device 302A, device 302B, and device 302C. The network 400 also includes access device 108. In other words, the network 400 is substantially similar to the network 300 except that access device 108 has been turned on near the network 400, to which it is associated, or has entered the an area to which the network 400 can reach.

When access device 108 can enter the network 400 as shown in FIG. 4, access device 108 may be authenticated based on the access device's authentication with the logical network or may otherwise commence communication with cloud network 114. Access device 108 may also communicate notification of its presence or other information directly to other devices 302A-302C within network 400, as shown in FIG. 4. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 400, including device 302A, device 302B, device 302C, information/data regarding its status. Such status data may include the fact that it is present and turned on, or other status data/information. At any time that devices 302A, 302B, 302C and 302D recognize that access device 108 is present at network 400, the devices may communicate back to access device 108. For example, the devices may send an acknowledgement (e.g. ACK signal) back to access device 108 to confirm that they received the status data sent by access device 108. The devices may also send their own status data to access device 108.

While devices 302A-302C and access device 108 may each receive communication from other devices around the network 400, including the status of each of those devices, devices 302A-302C and/or access device 108 may be continuously scanning network 400 (including, for example, running discovery algorithms) to determine whether any devices within the network have moved, turned on/off or otherwise added to or subtracted from the network, or have otherwise changed statuses.

Even though each device may know and store the state of each other device within local area network 400, a device may not know when another device changes status (e.g. turns/powers off). However, devices and/or access devices within local area network 400 may broadcast/send any updates in its status to other devices on the network. For example, if device 302A changes status, it may send status data to the other devices, such as devices 302B, 302C and 302D and to access device 108. However, device 302A may not know which devices to update since the other devices may change statuses periodically (e.g. turn off).

Therefore, a network or access device may subscribe to another network or access device within local area network 400. For example, devices 302B, 302C and access device 108 may subscribe to status data notifications/updates from device 302A. Such a subscription may be registered for upon initial connection with device 302A when device 302A first enters local area network 400 or at any other time after device 302A has been associated with local area network 400. Subscriptions may be controlled to last indefinitely or may expire after a certain predetermined period of time after initial subscription. However, devices may re-subscribe to another device before or after their previous subscription has expired.

Subscriptions between device and/or access devices may be registered similar to registering a device upon initial entrance into the local area network including security registrations described herein with respect to FIG. 1. For example, a device may send its unique security key, which it may have stored along with its network ID after being registered on the network, to a device to which it wants to subscribe. However, subscriptions may take on many other forms, including sending a different form of identification to a device to which a device wants to subscribe. Upon receiving a subscription from another device or access device, the device being subscribed to may store a list of the devices that subscribed to it. For example, device 302A may store a list of devices 302B, 302C, and access device 108 after those devices subscribe to device 302A. Then, when device 302A undergoes a change in status, device 302A may send that change in status to only the devices that had previously subscribed to it but where the subscription had not yet expired. Furthermore, according to some embodiments, the subscription list of a device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Since devices 302 and access device 108 may each receive communication from other devices around network 400, including the status of each of those devices, each device within network 400 may know the status of each other device in the network 400. For example, access device 108 or devices 302 may not be required to communicate with cloud network 114 in order to obtain one or more of such statuses. Since cloud network 114 is an external network and may be remote from network 400, communication between devices within the network 400 and cloud 114 may take more time than communication between two devices within network 400. For example, communication between devices within network 400 may take anywhere from 1 millisecond to 100 milliseconds, while communication between a device within network 400 and the cloud network 114 may take anywhere from 50 milliseconds to 1 second or more). Furthermore, if a device is retrieving information from cloud 114, the request must travel from the device to cloud network 114, and then the information must travel back from cloud network 114 to the device. This process may double the latency caused by retrieving information with cloud 114. Therefore, devices within the network 400 may choose to send and receive/retrieve statuses directly with other devices within the network instead of communicating such information via cloud network 114. When a device receives status data from another device on the device's local area network, it may store that status data so that it may retrieve and use that status data at a later time.

Throughout FIGS. 5-11, graphical interfaces (e.g., displays) are shown in an access device (e.g., the access device 108) rendering one or more visual interfaces to enable control of operation of a device (e.g., the device 302A, 302B, and 302C) when available within a network (e.g., a local area network). A device can include or be communicatively coupled to a home automation network device. The visual interfaces can be rendered upon execution of a visual interface module by an application on the access device. The visual interfaces are shown with one or a combination of tiles, interactive areas, interactive elements, icons, links, command regions, windows, toolbars, sub-menus, drawers, and buttons that are used to initiate action, invoke routines, monitor network devices, configure network devices, control network devices, or invoke other functionality. The initiated actions include, but are not limited to, displaying a status of a device, displaying a current state of the device, displaying historical data associated with the device, displaying a last known status of the network device, selecting one or more primary settings for the device, selecting one or more secondary or tertiary settings of the device, and other inputs and gestures. For brevity, only the differences occurring within the figures, as compared to previous or subsequent ones of the figures, are described below.

Figure 5:
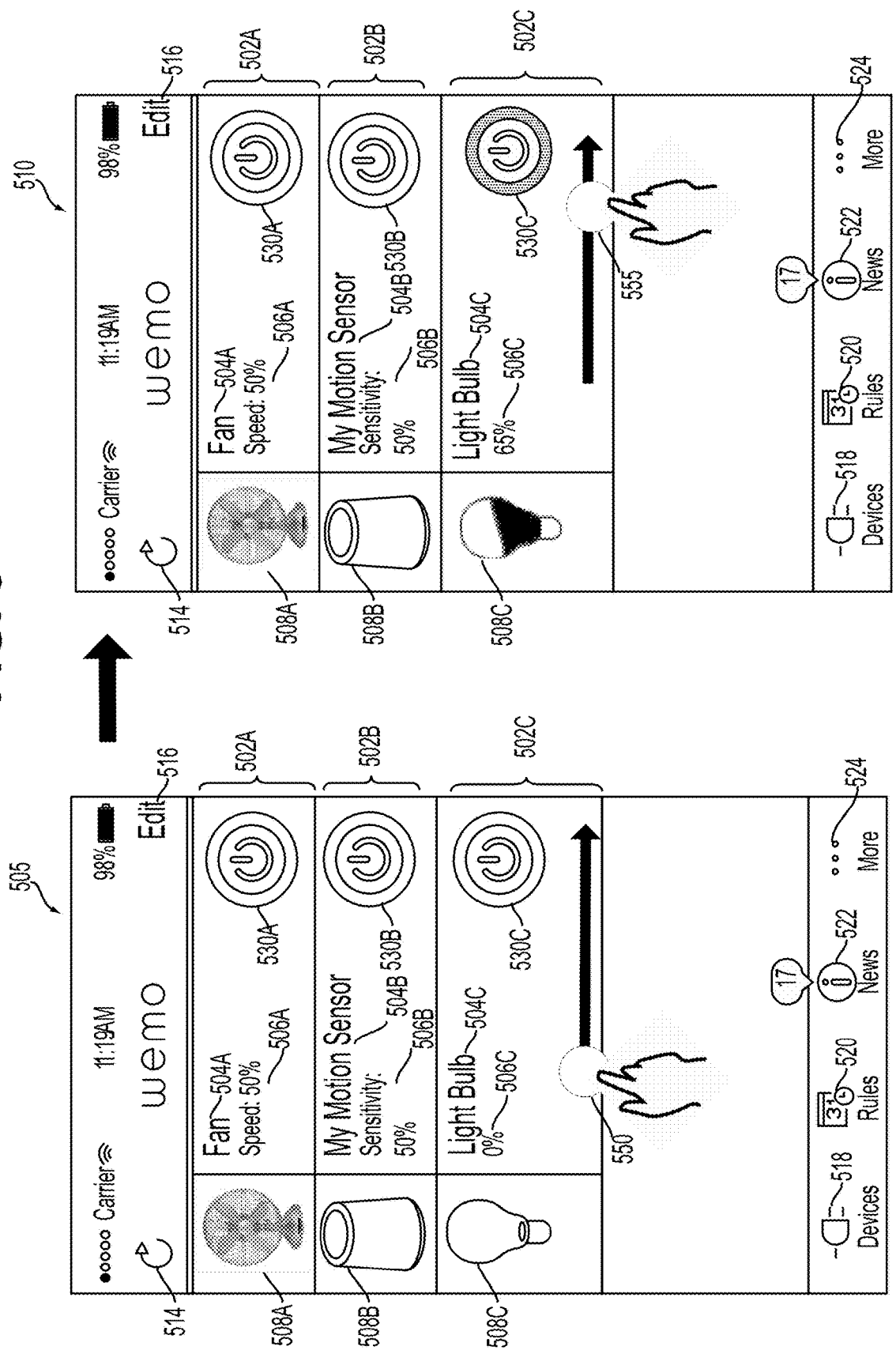
FIGS. 5-11 depict examples of displays for controlling a device connected to a network in accordance with some embodiments.

FIG. 5 shows an exemplary display 505 of an application executing on an access device according to an embodiment of the present invention. The display 505 includes a graphical interface with modular tiles 502A, 502B, and 502C for interacting with devices in a network. The modular tile 502A, modular tile 502B, and the modular tile 502C correspond to device 302A, device 302B and device 302C, respectively. A modular tile can enable interactions to monitor and/or control a device corresponding to the modular tile.

As explained before, a modular tile can include interactive areas or interactive elements to enable interaction with the modular tile. The tiles 502A, 502B, and 502C can each include respective icons 508A, 508B, and 508C, and respective names 504A, 504B, and 504C corresponding to a device. For example, tile 502A corresponds to a fan and includes an interactive element depicted as a power button 530A for turning the fan on and off. In another example, tile 502B corresponds to a motion sensor and includes an interactive element depicted as a power button 530B for turning the sensor on and off. In another example, tile 502C corresponds to a light bulb and includes an interactive element depicted as a power button 530c for turning the light bulb on and off. An interactive element shown as a control (e.g., power button) can be displayed based on a state of the device corresponding to the control. The interactive element can be visibly illuminated, colored, shaded, bolded, or modified to a different shape.

In some embodiments, tiles 502 are customizable by developers and/or manufacturers of the corresponding devices. For, example, name 504B is customized to indicate the name of a specific type of sensor (e.g., "My Motion Sensor"). In additional or alternative embodiments, tiles 502 can convey status information about a corresponding device, including, but not limited to, a firmware version, a last known firmware update status, status for connectivity to a cloud network, registration status (i.e., an indication that the device has a key or does not), a primary mode of the device (i.e., on, off), a secondary mode of the device (i.e., standby, high, low, eco), a schedule, settings (e.g., speed or sensitivity) for the device, and one or more attributes (e.g., brightness) related to operation of the device.

Each of the tiles 502 can be chosen and displayed based on the type and/or capabilities of a device (e.g., the devices 302A, 302B, 302C). The display 505 is flexible and can dynamically display the most appropriate tile 502 for whatever environment the application is run in. For instance, the display 505 enables a mechanism wherein a user can pre-configure a tile 502B to display the most appropriate message for a connected sensor. For example, a user can connect any one of a plurality of types of sensors (e.g., water, humidity, temperature/heat, air pressure, light, sound, smoke, carbon monoxide, motion, etc.) to a network. As shown in FIG. 5, instead of presenting a default interface stating a generic message like 'the sensor has detected something at a certain time' the tile 502B can be configured it to provide a sensor-specific status (e.g., 'Motion sensed in the living room 11:05 AM' or 'someone is in the living room.'). Similarly, tiles 502 for other types of sensor devices can be configured to present sensor-specific states 506 or status messages such as, for example, 'the leak detector at a certain location has detected elevated levels of moisture' or 'the smoke detector has detected smoke in the kitchen.'

As shown in FIG. 5, the tile 502A can display a status 506A of a setting or attribute related to operation of the device 302A. For example, the status 506A can indicate a speed (e.g., a speed of 50%) for the device 302A (e.g., 302A). Tile 502B can display a status 506B of a setting or an attribute related to operation of the device 302B. For example, the status 506B can indicate a sensitivity (e.g., a sensitivity of 50%) for the device 302B (e.g., a sensor). Tile 502C can display a status 506C of a setting or an attribute (e.g., brightness) related to operation of the device 302C. For example, the status 506C can indicate a brightness (e.g., brightness of 0%) output by the device 302C (e.g., a light bulb). In some embodiments, the tile 502 or the interactive elements in the tile 502 can be displayed differently based on the status of the device corresponding to the tile. In the example shown in the display 505, the status 506C indicates that the light bulb is at 0%, which corresponds to the light bulb being turned off. In an embodiment, this status is also reflected by the power button 530C for the light bulb not being lit up or shaded/bolded.

FIG. 5 also shows how display 505 can include interactive elements (e.g., selectable icons and links) 514, 516, 518, 520, 522, and 524 outside of the tiles 502. For example, refresh icon 514 can be selected to refresh information presented in display 505, such as, for example, status and state information displayed in tiles 502A, 502B, and 502C. For instance, one or more of the statuses 506A-506C for each of the tiles 502A-502C, respectively, can be refreshed on an automatic, periodic basis, in addition to being manually updated when refresh icon 514 is selected.

In some embodiments, the display 505 can include an edit link 516. Interaction with the edit link 516 can enable one or more of the tiles 502A, 502B, and 502C to be editable. For example, edit link 516 can be selected to sort or re-order the sequence of tiles 502A, 502B, and 502C displayed in the display 505. Upon interaction with the edit link 516, one or more of the tiles 502A, 502B, and 502C can be interacted with to be disabled or removed. Devices icon 518 can be selected to cause a graphical interface to be presented with one or more devices that are discovered in a network.

In some embodiments, the display 505 can include a rules icon 520. Interaction with a rules icon 520 can enable a graphical interface to enable customization of display rules pertaining to the devices. The graphical interface can provide one or more interactive elements to control one or more rules related to control of the devices (e.g., the devices 302A, 302B, 302C). The graphical interface can be presented in the display 505 or can be shown separately from the display 505.

In some embodiments, the display 505 can include a news icon 522. Interaction with the news icon 522 can enable a graphical interface to be display which presents news including information associated with the devices and/or the applications. For instance, interaction with the news icon 522 can cause a graphical interface to be displayed in the access device to present information related to the devices controlled via the tiles 502A, 502B, and 502C and/or information relevant to the application, such as notifications of available tile updates.

In some embodiments, the display 505 can include a more icon 524. Interactive with the more icon 524 can provide one or more additional graphical interfaces to enable access to additional features for controlling and/or monitoring the devices in a network. For example, an additional graphical interface can be displayed to control one or more settings and/or attributes of any devices connected to a network. An example of an additional graphical interface is described with reference to FIG. 11.

The display 505 can receive input to control one or more functionalities and/or to adjust one or more settings or attributes related to operation of a device identified in the display 505. The functionalities can include secondary functionalities, tertiary functionalities, etc. beyond primary functionalities (e.g., power control). The display 505 can be interactive or can include interactive areas to receive input to assist the user in controlling a functionality, setting, or attribute of a device identified in the display 505. For example, each tile 502A-502C can receive input via a portion of the display 505 including the tile 502A-502C corresponding to a device. The input received via the corresponding tile can be used to control operation of a device corresponding to the tile. The input can include one or more of a tap, a touch, a click, a swipe, a continuous movement, other motions, or a combination thereof. In some embodiments, the input can be received as a series of inputs to control the device corresponding to the tile. The input can be provided in one or more directions in the tile.

In one illustrative example, the display 505 can receive input in any area (e.g., interactive area 550) of the tile 502C to control a setting or an attribute related to operation of the device 302C. The input can be can be a continuous movement or motion (e.g., slide or swipe) of a finger across the display 505 in the tile 502C to a different interactive area 555 in the display 510. The display 505 can be adjusted to the display 510 as the input is received from one area 550 to another area 555. In some embodiments, a movement along an axis of a dimension in the tile 502C can control a setting or an attribute related to operation of the device 302C. For example, a movement corresponding to the input can control brightness of the light bulb 302C corresponding to the tile 502C.

The input (e.g., the movement) can cause the attribute or the setting (e.g., brightness) of the device 302C to be adjusted. The adjustment to the attribute can be based on an amount of the input, a length of time when the input is received, a distance of movement corresponding to the input, a direction of the input, or any other criteria associated with information obtained from the input. The device can be adjusted from the last known state or value of the attribute or setting that is being adjusted. The attribute can be adjusted in proportion to the distance of movement indicated by input. The attribute can continue to adjust so long as the input is received continuously until a maximum value or state can be reached for the attribute. The attribute can be adjusted based on a direction of the movement indicated by the input. For example, a movement from left to right in the tile 302C can correspond to an increase in a value of the attribute and a movement from right to left in the tile 302C can correspond to a decrease in the value of the attribute, or vice versa.

In response to the input received starting from the interactive area 550, the display 505 can be modified to present the display 510. The input received from the area 550 to the area 555 can be transmitted to the network on which the device 302C is connected. The display 510 can show an indication of the adjustment to the device 302. For example, the tile 502C corresponding to the device 302C can be modified or replaced with a modified tile to show a change in status of the device 302C. The modified tile 502C can be presented with the updated status after or before receiving an updated status indicating the change was received by the device 302C. In some embodiments, the icon 508C can be modified to indicate a change in the setting or the attribute by showing a change in a visual appearance of the icon 508C. For example, the icon 508C may be modified to show the light bulb filled, shaded, dimmed, or brightened to an amount corresponding to the amount of brightness which reflects the updated status. The status 506C can be modified to show an updated status that reflects an amount of brightness of the bulb resulting after the adjustment. In some embodiments, the status 506C can indicate an amount of the adjustment. The power button 530C can be updated corresponding to a change in the status of the device 302C for the tile 502A. In FIG. 5, the power button 530C can be modified to indicate a color or shading because the status of the light bulb 302C changed from brightness of 0% to a brightness of 65%.

In some embodiments, the display 510 may be modified to indicate an adjustment to a setting or an attribute of a device 302 even before an adjustment for the setting or the attribute can be made at the device. For example, in FIG. 5, the icon 530C may be modified to indicate that an adjustment has been requested. In some embodiments, the tile 502C may be modified to display an indication of an adjustment to the setting by modifying the status 506C. Such an indication may be useful to inform a user that his desired setting has been requested based on the input provided by the user. Thus, the indication may identify that a desired change in a setting or an attribute, without actually indicating that the device has been adjusted. By providing such an indication, a user may determine whether he wishes to make further adjustments.

In some embodiments, the display 510 may be modified to indicate that an adjustment based on user input has in fact been made at a device 302. Continuing from the previous example, the tile 502C can be further modified to indicate that the device 302C has been adjusted based on input received from the area 550 and the area 555. For example, the icon 508C can be updated to reflect that the device 302C has been adjusted to a brightness corresponding to the status 506C, which may already be shown in the tile 502C. Alternatively or additionally, the icon 530C may be further modified to change an appearance, although not shown in FIG. 5. The tile 502C may be modified in many ways to provide confirmation that the corresponding device 302C has been adjusted. Providing an indication that an adjustment has been made may be useful in systems application of the adjustment at the device 302 may take longer than expected.

Figure 6:
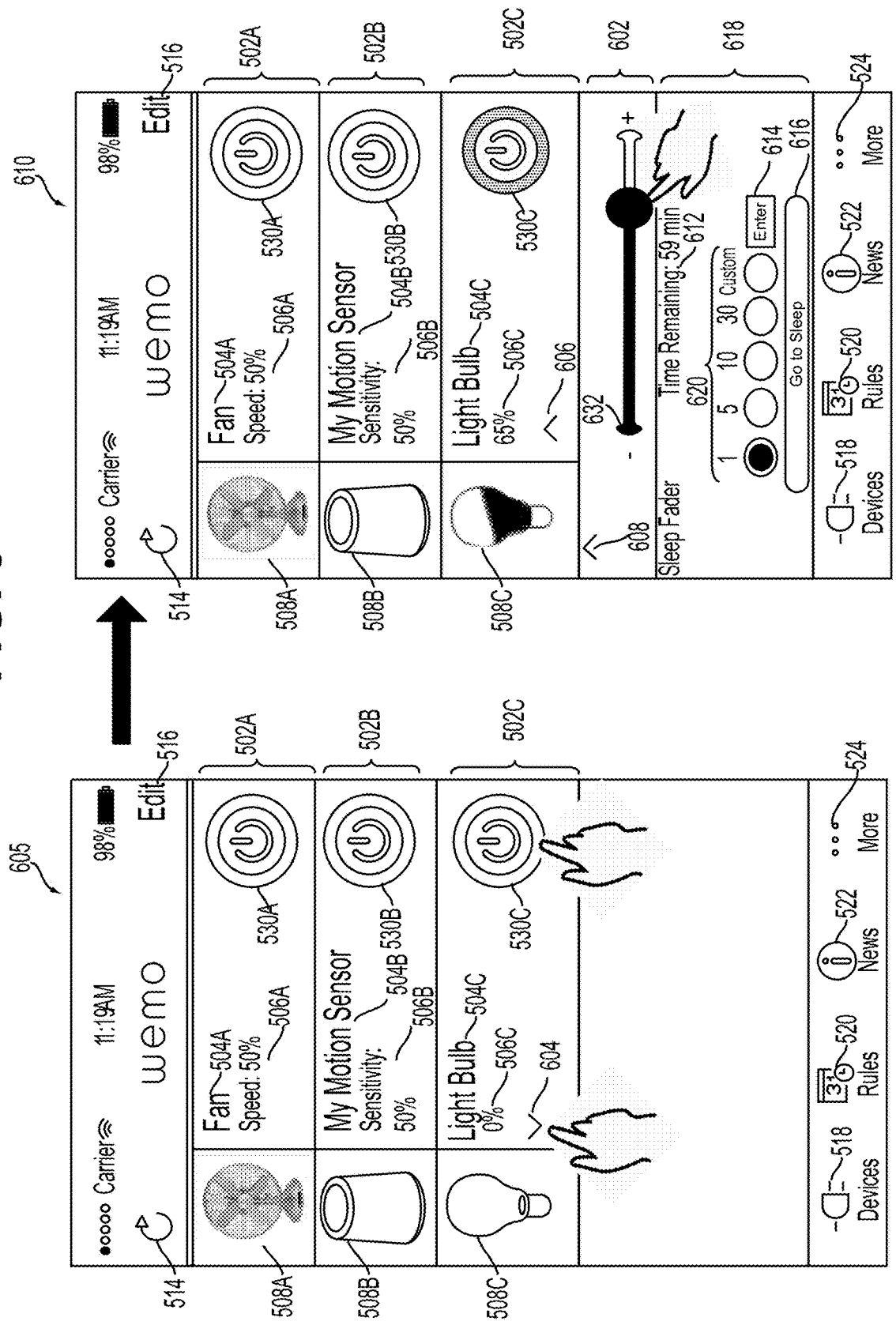

FIG. 6 shows another exemplary display 605 of an application executing on an access device according to an embodiment of the present invention. The display 605 can include elements described with reference to FIG. 5, such as elements of the display 505. The display 605 can include a graphical interface with modular tiles 502A, 502B, and 502C for interacting with devices in a network. The modular tile 502A, modular tile 502B, and the modular tile 502C correspond to device 302A, device 302B and device 302C, respectively.

FIG. 6 shows some embodiments for controlling operation of a device corresponding to a modular tile. A modular tile, such as tile 502C, can include one or more interactive elements (e.g., control 604). Interaction with a modular tile (e.g., selection of the modular tile by a user), an interactive area in the module tile, or one or more interactive elements included in the tile can cause the application to provide one or more additional visual interfaces in the graphical interface of the display 605. For example, any interaction with the tile such as a selection of the power button 530C in tile 502C, interaction with the tile 502C, or selection of the control 604, can cause one or more additional visual interfaces to be displayed in the display 610. An additional visual interface can enable a user to control one or more attributes and/or one or more settings related to operation of the device corresponding to the modular tile.

FIG. 6 shows an example of multiple visual interfaces that can be displayed upon interaction with a modular tile. To illustrate, upon interaction with the control 604, interaction with the tile 502C, or selection of the power button 530C, the display 605 can change to a new display 610. The display 610 can include elements of the display 605, such as the modular tiles 502A, 502B, and 502C for interacting with devices in a network. In some embodiments, the display 610 can include one or both of the visual interfaces 602, 618. In this example, the display 610 can include an additional visual interface 602 and an additional visual interface 618. Although the visual interfaces 602, 618 are shown below the tiles 502A-502C, the visual interfaces 602, 618 can be shown above, under, or any other position in the display 610 that can be identifiable with a corresponding tile from which the additional visual interfaces 602, 618 were initiated for display.

An additional visual interface can appear as a sub-menu that enables control of attributes and/or settings related to operation of a device corresponding to a tile. For example, the visual interfaces 602,618 can be a sub-menu to control attributes and/or settings for the device 302C the corresponding to tile 502C. In some embodiments, a visual interface may appear to a user as one or more drawers. The visual interface may be displayed for a time period as it may not be displayed unless otherwise requested by a user. In such embodiments, the visual interface can be displayed momentarily (e.g., for a brief time period), conceptually presented as a 'peekaboo drawer.' The additional visual interfaces 602, 618 can enable adjustment of settings related to a primary functions of the device, such as turning a device on and off, or secondary functions such as adjusting a setting or an attribute when a device is operational (e.g., in a powered-on state). An additional visual interface, e.g., the visual interface 602, can include an interactive element (e.g., an interactive element 608) to hide or cause the visual interface to disappear. The tile 502C corresponding to the visual interface 602 can include an interactive element 606 to cause the visual interface 602 to disappear. Alternatively or additional, when a visual interface is displayed, interaction (e.g., a tap) with the tile 502C can cause the visual interface to disappear.

Also shown in the example provided in FIG. 6, the visual interface 602 can include an interactive element 632 to enable dynamic adjustment of an attribute or setting related to operation of a device that is powered in an "on" state, such as the device 302C. In some embodiments where the device in the display 610 as being powered in an "off" state, the interactive element 632 can be used to adjust the attributes and/or the settings to be applied at a later time when the device is powered in an "on" state. In this case, the device 302C is a light bulb, which can have many settings and attributes, such as brightness, light color, color temperature, 3-way settings, etc. The interactive element 632 can enable adjustment (e.g., sliding) in a single direction (e.g., a horizontal direction or a vertical direction) when moved, causing an adjustment to the attribute or the setting associated with the interactive element 632. The scale (e.g., range of values) for adjustment of the interactive element can correspond to a range of values or states associated with an attribute. The scale can be based on one or more units of increment (e.g., percentage or value). The attribute or setting controlled by the interactive element 632 can be adjusted (e.g., increased/decreased, changed, etc.) based on movement of the interactive element 632. Movement in one direction can cause a value of an attribute, such as brightness to increase, and movement in another direction cause the value to decrease. The adjustment can vary based on the setting, and can include, among others, different gradients, scales, measurements, states, or values.

The visual interface 602 can include multiple interactive elements, each controlling one attribute or setting related to operation of a device. In some embodiments, the visual interface 602 may not include the interactive element 632, and instead can enable a user to adjust a setting or an attribute by accepting input (e.g., a motion, a swipe, a tap, a click, a selection, etc.). The input can be accepted in any direction. Input can be accepted in multiple directions where each direction can control adjustment of a different attribute or a different setting.

In this example, the interactive element 632 can control a percentage of brightness of the light bulb 302C. A change in the interactive element 632 can be updated to the tile 502C. For example, the icon 508C and/or the status 506C can be updated to reflect an indication of a change in the brightness attribute. Similarly, the tile 502C can be updated to provide a visual indication (e.g., a motion, a color, animation, shading, etc.) to indicate an adjustment.

Continuing with the example shown in FIG. 6, the visual interface 618 (e.g., "sleep fader") can provide one or more interactive elements to control a time period for applying (e.g., fading) an adjustment for the input received from the interactive element 632. For example, the adjustment specified by the interactive element 632 for the light bulb 302C will be applied over a time period indicated via the visual interface 618. In certain embodiments, the adjustment can be applied equally over the time period until a desired state is reached. The adjustment can be made based on a scale, a gradient, a measurement, or a range of values over which the adjustment can be made equal during the time period. In some embodiments, the adjustment can be applied unequally to the device based on criteria. For example, the brightness of the device 302C can be adjusted unequally over a time period according to a dimming curve (e.g., a logarithmic based curve) to which humans perceive a gradual change in light.

The visual interface 618 can enable a user to specify a time period over which a device (e.g., the device 302C) is to be powered to an "on" state from an "off" state. The device 302C can be adjusted to the last known state known for the device 302C. The last known state can based one or more or more attributes and/or settings of the device 302C. The adjustment to the last known state can be based on one or more attributes and/or settings related to the operation of the device 302C. Similar to applying the adjustment based on the time period specified via the visual interface 618, the device 302 can be gradually adjusted to the last known state based on the time period specified in the visual interface 618. The adjustment can be gradually changed by an equal or an unequal amount until the previous state is reached. The adjustment can be applied in a similar manner as described above when the device is being controlled while powered in an "on" state.

The visual interface 618 can include one or more interactive elements 620 that can enable a user to choose an interval or time period (e.g., 1 min, 5 min, 10 min, 30 min, a custom time, or any other time period) during which the adjustment to an attribute specified by the interactive element 632 is to be applied. Additionally or alternatively, the interactive elements 620 can include or implement a spinner control that enables a user to select one or more time periods. In some embodiments, the visual interface 618 can include an interactive element 614 that can enable a user to enter a time period to apply the adjustment to an attribute or a setting. Alternatively or additionally, the interactive element 614 can cause an additional visual interface (not shown) to be displayed in the display 610 that enables a user provide input indicating a time period. For example, the additional visual interface can be displayed in association with the visual interface 618 or on top of the visual interface 602 and/or the visual interface 618. The additional visual interface can include a spinner control or other type of interactive element that can enable a user to choose from a list of values to indicate a custom time period. The additional visual interface can include one or more interactive elements to specify a custom time period.

An interactive element 616 ("go to sleep") can enable the time period specified in the visual interface 618 to be applied for making the adjustment received via the visual interface 602. Interaction with the interactive element 616 can cause the time period to be applied to the adjustment made with the interactive element 632. Upon interaction with the interactive element 616, the visual interface 618 can be updated to include a title 612 that indicates a time period remaining (e.g., "59 min remaining") for a time period chosen via an interactive element 620 in the visual interface 618.

In some embodiments, the visual interface 618 can be presented alone without the visual interface 602. In such embodiments, the visual interface 618 can enable a user to control a time period for changing a state of operation for a device corresponding to the tile 502C associated with the visual interface 618. In the example provided in FIG. 6, the visual interface 618 can be used to indicate an interval or time period over which the device 302C is to be powered off from its current status (e.g., brightness of 65 percent). The visual interface 618 can also be used to indicate a time period over which the device 302C is to be powered to an "on" state based on a last known status (e.g., brightness of 65 percent) of the device 302C when connected to the network. The adjustment to the last known status can be based on one or more attributes and/or settings related to the operation of the device 302C. As described above, the device 302C can be gradually adjusted from a powered "off" state to a powered "on" state at the based on the time period specified in the visual interface 618.

Figure 7:
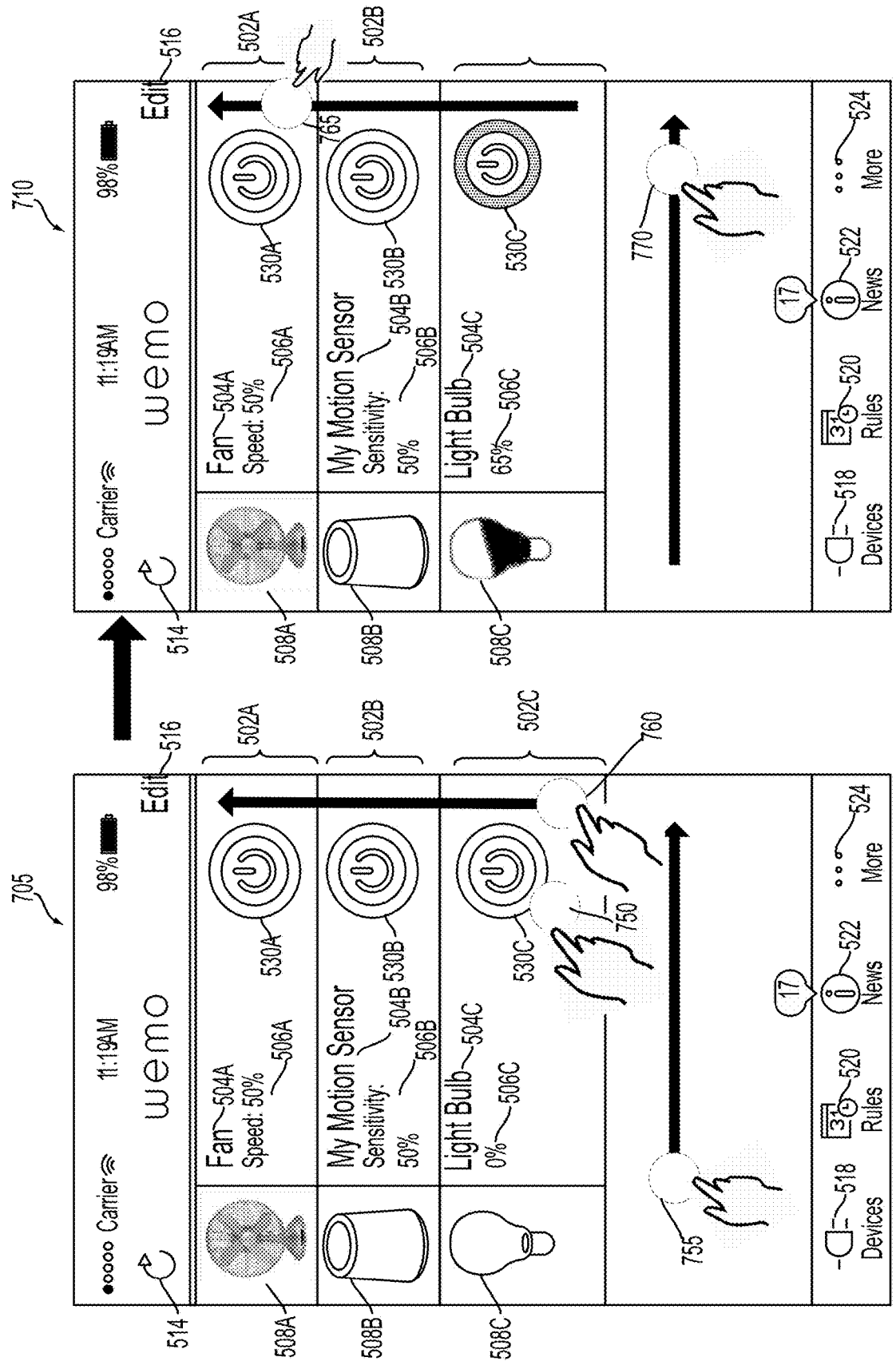

FIG. 7 shows another exemplary display 705 of an application executing on an access device according to an embodiment of the present invention. The display 705 can include elements described with reference to FIG. 5, such as elements of the display 505. The display 705 can include a graphical interface with modular tiles 502A, 502B, and 502C for interacting with devices in a network. The modular tile 502A, modular tile 502B, and the modular tile 502C correspond to device 302A, device 302B and device 302C, respectively.

FIG. 7 shows some embodiments for controlling operation of a device corresponding to a modular tile. A modular tile, such as tile 502C, can include one or more interactive elements or one or more interactive areas. Interaction with a modular tile (e.g., selection of the modular tile by a user), one or more interactive areas, or one or more interactive elements can enable the display 705 to receive input to control one or more functionalities and/or to adjust one or more settings or attributes related to operation of a device corresponding to one or more tiles 502A-502C in the display 705. For example, any interaction with the tile such as a selection of the power button 530C in tile 502C or interaction with the tile 502C can enable the display 705 to receive input to control one or more functionalities and/or to adjust one or more settings or attributes related to operation of the device 302C corresponding to the tile 502C. The functionalities can include secondary functionalities, tertiary functionalities, etc. beyond primary functionalities (e.g., power control). The display 705 can be interactive to receive input to assist the user in controlling a functionality, setting, or attribute of a device identified in the display 705. For example, each tile 702A-702C can receive input via a portion of the display 705 including the tile 702A-702C corresponding to a device. The input can include one or more of a tap, a touch, a click, a swipe, a movement, other motion, or a combination thereof. In some embodiments, the input can be received in a series of input to initiate control of the device corresponding to the tile. The input can be provided in one or more directions in the tile.

In one illustrative example, the display 705 can receive input via a tile to control a setting or an attribute related to operation of a device corresponding to the tile. For example, an input received in an interactive area 755 within the tile 502C or an input indicating selection of the power button 530C can cause initiate another state of the display 705. The new state can enable user can provide additional input, such as at an interactive area 755 outside the tile 502C or another interactive area within the tile 760, to control one or more attributes, one or more settings, or a combination thereof related to operation of the device 302C. In some embodiments, a user can skip providing input at the interactive area 750, and directly proceed to input at either or both of the interactive areas 755 and 760. By starting in the tile 502, the input received at the interactive area 760 can be associated with a device corresponding to the tile 502C where the input began. The display 705 may be interactive to receive an input, e.g., a continuous motion or a swipe, across the display 705 starting at the interactive area 755 or the interactive area 760 to control a setting (e.g., brightness) of the device 302C. In some embodiments, a movement in a one-dimensional direction can control one setting or attribute related to operation of the device 302C. For example, a movement in a single direction (e.g., horizontal direction) starting at the interactive area 755 can control one attribute or setting of a device, e.g., brightness of the light bulb 302C. Movement in another direction (e.g., vertical) opposite of the previous input can control another, different attribute, e.g., color temperature of the light bulb 302C. Additionally or alternatively, at step 2, a user moves a finger across a surface of the display 705 in a vertical direction alongside a different axis of the display 705 to control an attribute or setting of the device 302C.

The display 705 can be modified to a display 710 based on the input received starting at the interactive area 755 or the interactive area 760. The display 710 can be updated when movement is complete from the input starting at either or both of the interactive areas 755 and 760 to the interactive areas 770 and 765, respectively. The adjustment to the attribute can be based on an amount of the input, a length of time when the input is received, a distance in a movement corresponding to the input, a direction of the input, or any other criteria corresponding to the input or determinable based on the input. The device can be adjusted based on an adjustment indicated by the input. The attribute or setting can be adjusted in proportion to the distance of movement for the input. The attribute can continue to adjust so long as the input is received continuously until a maximum can be reached for the attribute. The attribute can be adjusted based on a direction of the movement for the input. For example, a movement from left to right in the tile 302C can indicate an increase in a value of a setting for adjustment and a movement from right to left in the tile 302C can indicate a decrease in the value of the setting for the adjustment, or vice versa. The adjustment can be communicated to the network on which the device is connected.

The display 710 can show an indication of the adjustment to the device 302. For example, the tile 502C corresponding to the device 302C can be modified to show a change in status of the device 302C. The display 510 can be presented with the updated status after or before receiving a response indicating the change was received by the device 302C. In some embodiments, the icon 508C associated with the tile 502A can be modified to indicate a change in status, such as a change in a visual appearance of the icon 508C. For example, an icon in a tile, such as the icon 508C, may be modified to indicate a state of the device corresponding to the tile 502C. The icon 508C can be modified in many ways, such as by showing the light bulb filled corresponding to a value or a change in the setting or the attribute (e.g., a change in an amount of brightness). The icon 508C can be modified by showing the light bulb dimmed, brightened, shaded, colored, or a combination thereof corresponding to an amount of brightness or a change in the state. In some embodiments, the icon 508C can be an image of a device, which can be modified in appearance by changing a contrast or color of the image. For instance, when the icon 508C is a light bulb, the icon 508C can be dimmed, brightened, shaded, colored, adjusted for contrast, or a combination thereof corresponding to the new state of the device. In some embodiments, a gradual change in the appearance of the icon 508C can be shown corresponding to a gradual change in an attribute or a setting of the device 302C or a gradual change to a different state. In another example, a status in a tile, such as the status 506C, can be updated to reflect the new value after the adjustment (e.g., an amount of brightness of the bulb resulting after the adjustment). The power button 530C can be updated corresponding to a change in the status of the device 302C for the tile 502A. In FIG. 7, the power button 530C can be modified to indicate a color or shading because the status of the light bulb 302C changed from brightness of 0% to a brightness of 65%.

Figure 8:
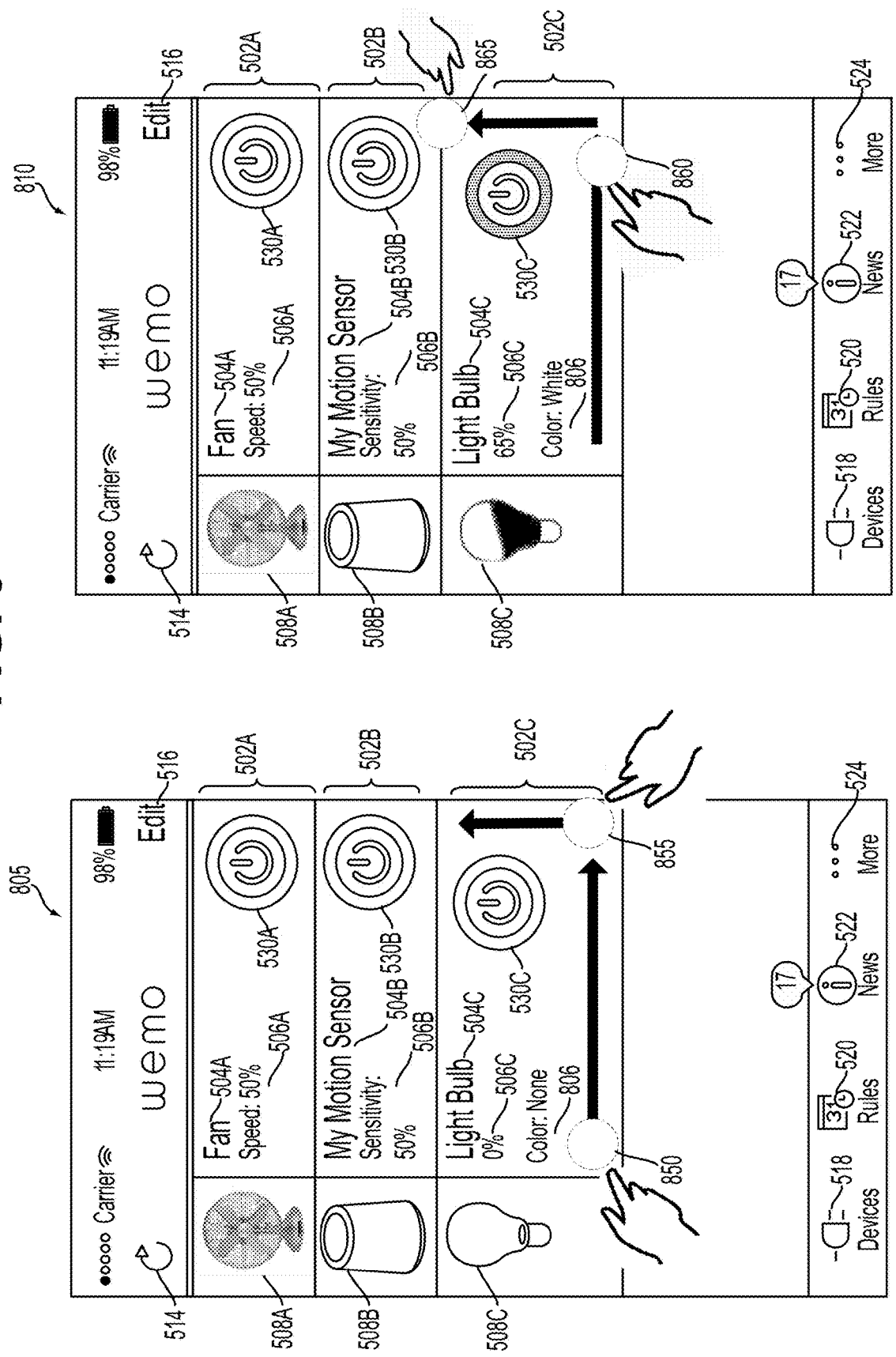

FIG. 8 shows another exemplary display 805 of an application executing on an access device according to an embodiment of the present invention. The display 805 can include elements described with reference to FIG. 5, such as elements of the display 505. The display 805 can include a graphical interface with modular tiles 502A, 502B, and 502C for interacting with devices in a network. The modular tile 502A, modular tile 502B, and the modular tile 502C correspond to device 302A, device 302B and device 302C, respectively. In the example shown in FIG. 8, some tiles, e.g., 502C, can display multiple attributes and/or settings related to operation of a device associated with the tile. The tile 502C can include an interactive element 608 that indicates a state of color for the light bulb. In this example, the light bulb 302C has no color and no brightness because the light bulb is off. The power button 530C may provide an indication of a state (e.g., off) of the device 302C.

As explained earlier, the display 805 can receive input via a tile to control one or more functionalities and/or to adjust one or more settings or attributes related to operation of a device identified in the display 505. For example, each tile 502A-502C can receive input via a portion of the display 505 including the tile 502A-502C corresponding to a device. The input received via the corresponding tile can be used to control operation of a device corresponding to the tile. In the example shown in FIG. 8, each of the tiles 502A-502C can receive multiple inputs, each of which can cause a different attribute or setting to be adjusted for operation of the device 302A-302C, respectively. In some embodiments, the input can be received as a series of inputs to initiate control of the device corresponding to the tile. The input can be provided in one or more directions in the tile.

In one illustrative example, the display 805 can receive multiple inputs via the tile 502C to control multiple settings and/or attributes related to operation of a device corresponding to the tile 502C. For example, in the display 805, a user can provide input (e.g., a slide or a swipe of a finger) starting in an interactive area 850 of the tile 502C. In the same example, the user can provide an input (e.g., a slide or a swipe of a finger) starting in a different interactive area 855 of the tile 502C. In some embodiments, the input received at the interactive area 850 and the interactive area 855 can be performed in parallel or a different order. In some embodiments, a movement in one direction (e.g., horizontal) from the interactive area 850 can control a setting or an attribute related to operation of the device 302C corresponding to the tile 502C and a movement in another direction (e.g., vertical) from the interactive area 855 can control a different setting or attribute. For example, a movement of a finger across the tile 502C in a horizontal direction from the interactive area 850 can control brightness of the light bulb 302C corresponding to the tile 502C. In the same example, a movement of a finger across the tile 502C can control a color attribute of the light bulb 302C corresponding to the tile 502C. In the case of a color attribute, the attribute may have multiple states. An adjustment of an attribute can be based on a movement in a direction of the input from one step to another. The adjustment based on the input received from The display 805 can be modified to a display 810 based on the input received starting at the interactive area 850 or the interactive area 855. The display 810 can be updated when movement is complete from the input starting at either or both of the interactive areas 850 and 855 to the interactive areas 860 and 865, respectively. The display 810 can show an indication of the adjustment to the device 302C based on the inputs. As explained above, the tile 502C can be modified to reflect a change in a status based on the input. The status 506C can be updated to reflect an amount of brightness of the bulb resulting after the adjustment. The color indicator 806 can be updated to indicate a changed state of color for the light bulb 302C since the light bulb 302C is on. In some embodiments, the status 506C can indicate an amount of the adjustment. The power button 530C can be modified corresponding to a change in the status of the device 302C for the tile 502A. The power button 530C can be modified to indicate a color or shading because the status of the light bulb 302C changed from brightness of 0% to a brightness of 65%.

Figure 9:
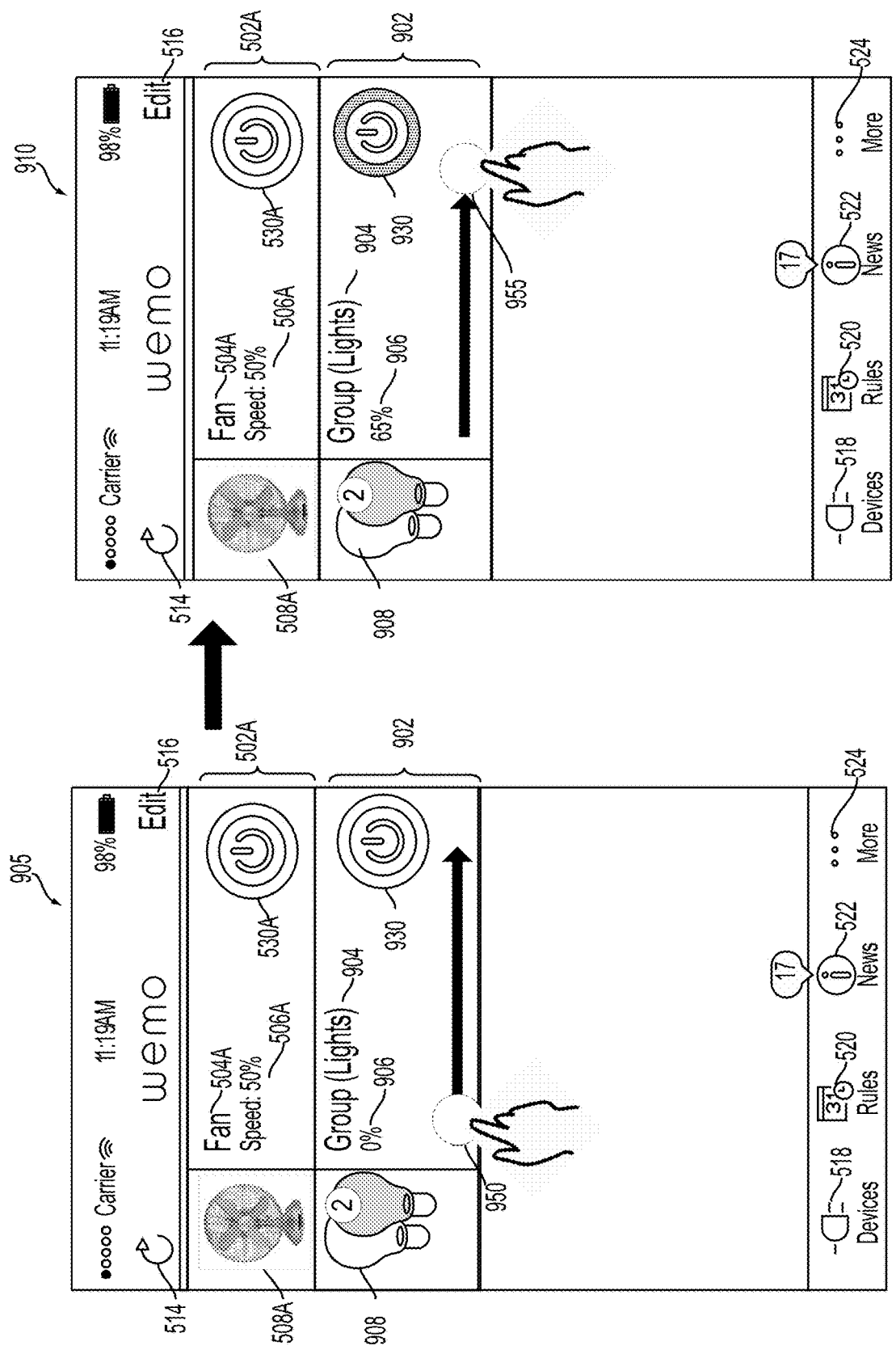

FIG. 9 shows another exemplary display 905 of an application executing on an access device according to an embodiment of the present invention. The display 905 can include elements described with reference to FIG. 5, such as elements of the display 505. The display 905 can include a graphical interface with modular tiles 502A for interacting with a device in a network. The modular tile 502A can correspond to device 302A. In certain embodiments, a tile can correspond to multiple devices (e.g., a group of devices) and interaction with the tile can enable a user to monitor and/or control operation of those devices. The devices in a group can have similar types of devices or can have different types of devices. For example, the display 905 shows a tile 902 that corresponds to multiple light bulbs in a group. The tile 902 can correspond to light bulbs including the light bulb 302C.

The tile 902 can include an icon 908 representative of the types of devices in the group. The icon may indicate a count of the devices in the group (e.g., "2"). The tile 902 can include a label such as label 904, which indicates a name of the group. The name can be customized to indicate a name and/or a status of the group. The tile 902 can include information about a status of the device, such as a status 906 corresponding to brightness of all the light bulbs in the group. The tile 902 can include an interactive element, such as a power button 930, which can control operation of the devices in the group. The power button 930 can operate in a similar manner as the power buttons 530A-530C. The power button 930 can be interactive to receive input to control a power state of the devices in the group. In such embodiments, one or more attributes and/or one or more settings of the devices in the group can be controlled collectively based on input received via the display 905 or the tile 902.

The tile 902 can be interactive and can operate in a manner similar to a tile previously described with reference to FIGS. 5-8. In particular, the tile 902 may be interactive to receive input in a similar manner for tiles described with reference to FIGS. 5 and 8. However, control of an attribute or a setting is applied to all devices in the group. For example, the tile 902 may be interactive to receive input from one or more interactive areas in the tile, such as input received at an interactive area 950. In this example, the input can be a continuous movement of a finger across the tile 902 to a different interactive area 955 in the tile 902. In response to the input, the display 905 can be modified to 910 to indicate an updated status of the tile 902 based on the adjustment. For example, the icon 908, the status 906, and/or the power button 930 can all be modified to indicate a value of a status change for the devices in the group or to affect an appearance of the devices in the group.

The adjustment to a setting or an attribute of each device in a group can be performed as described above for adjustments to a single device. The tile 902 can be configured such that a similar attribute of the devices similar to the group are adjusted based on the attribute. Devices that are different amongst the other in the group can be adjusted based on a different attribute. In some embodiments, before the group is created, each of the devices in the group may have a different status with respect to a similar attribute or setting that may be different (i.e., have a different value) for each device. In such embodiments, each similar attribute can be adjusted proportionally based an adjustment corresponding to the input. As explained above, the adjustment based on an input (e.g., a continuous movement) can correspond to a scale, a gradient, a range, or other criteria by which the input can be measured.

Figure 10:
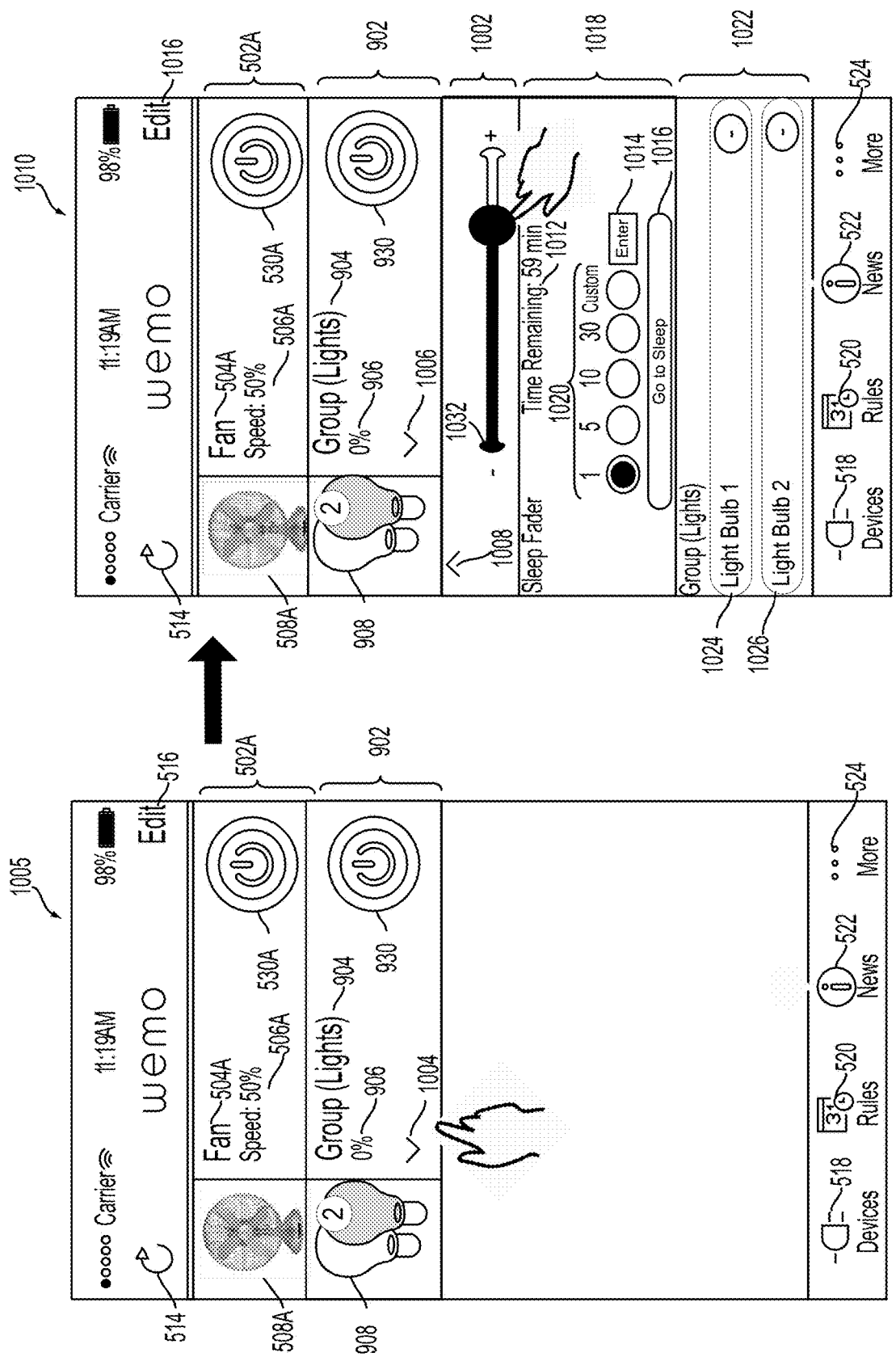

FIG. 10 shows another exemplary display 1005 of an application executing on an access device according to an embodiment of the present invention. The display 1005 can include elements described with reference to FIGS. 5 and 9, such as elements of the display 505 and elements of the display 905. The display 1005 can include a graphical interface with the modular tile 502A and the modular tile 902 for interacting with devices in a network. The modular tile 502A can correspond to the device 302A. The modular tile 902 can correspond to the device 302C among other light bulbs.

In some embodiments, such as the one shown in FIG. 10, a tile for a group of devices, such as the tile 902, can include one or more interactive elements (e.g., control 1004). Interaction with a modular tile (e.g., selection of the modular tile by a user), one or more interactive areas within the modular tile or the display 1005, or one or more interactive elements included in the modular tile can cause one or more additional visual interfaces to be displayed in the graphical interface of the display 905. For example, any interaction with the tile such as a selection of the power button 930 in tile 902, interaction with the tile 902, or selection of the control 1004, can cause one or more additional visual interfaces to be displayed in the display 1005. An additional visual interface can enable a user to control one or more attributes and/or one or more settings related to operation of the device corresponding to the modular tile. In the example shown in FIG. 10, the visual interfaces 1002, 1018, and 1022 can be displayed in the display 1010. In some embodiments, the display 1005 can be modified to the display 1010 to accommodate the presentation of one or more visual interfaces, such as the visual interfaces 1002, 1018, and 1022. In certain embodiments, the tile 902 can be modified to include an interactive element 1006. The interactive element 1006 can be interactive to receive input to hide or remove the visual interfaces 1002, 1018, and 1022 displayed in response to input from the previous display 1005.

The visual interface 1002 can operate in a manner similar to the visual interface 602. In some embodiments, the visual interface 1002 can include interactive elements 1008 and 1032 similar to the visual interface 602. The visual interface 1002 can include an interactive element 1032 to enable dynamic adjustment of an attribute or setting related to operation of a group of devices that are powered in an "on" state, such as the device 302C among other light bulbs. As explained above with reference to FIG. 6, an adjustment can be determined based on input received via the interactive element 1032. The adjustment can be based on the movement or interaction with the interactive element 1032. The devices in the group can be controlled based on the adjustment. The adjustment can be applied to the devices in a manner similar to that described for a single device or for a group of devices with reference to FIG. 9. The interactive element 1008 can cause the visual interface 1002, 1018, and/or 1022 to be removed or hidden from view in the display 1010.

The visual interface 1018 can operate in a similar manner to the visual interface 618. In some embodiments, the visual interface 1018 can include one or more interactive elements 1012, 1020, 1014, 1016 that are similar to those displayed in the visual interface 618. As explained above, the visual interface 618 can enable a user to specify a time period for modifying an attribute or a setting of a device. Here, the interactive elements 1020, 1014, 1016 can enable receipt or specification of a time period. The interactive elements 1020 can enable a user to select one or more time periods for applying the adjustment to an attribute or a setting of the devices in the group corresponding to the tile 902. The interactive element 1014 can enable a user to input a customer time period instead of choosing a time period indicated by the interactive element 1020. Similar to a single device, an adjustment to an attribute or a setting can be applied proportionally based on the time period. The adjustment to an attribute or a setting can be applied also be applied individually to each of the devices in the group based on the time period. In some embodiments, because the devices in the group may have a different status for a setting or an attribute, an adjustment can be applied based on the time with respect to each individual status. The adjustment can be applied in response to interaction with the interactive element 1016 (e.g., "go to sleep" control) that initiates application of the adjustment.

In some embodiments, the display 1010 can include a visual interface 1022. The visual interface 1022 can present information about each device that is associated with the group of devices corresponding to the tile 902. For example, the visual interface 1022 can include one or more interactive elements for each device in the group. An interactive element 1024 can correspond to a first light bulb (e.g., "light bulb 1") in the group and an interactive element 1026 can correspond to a second light bulb (e.g., "light bulb 2") in the group. Each of the interactive elements 1024, 1026 can be interactive to cause a light bulb corresponding to the interactive element to be removed from the group.

Figure 11:
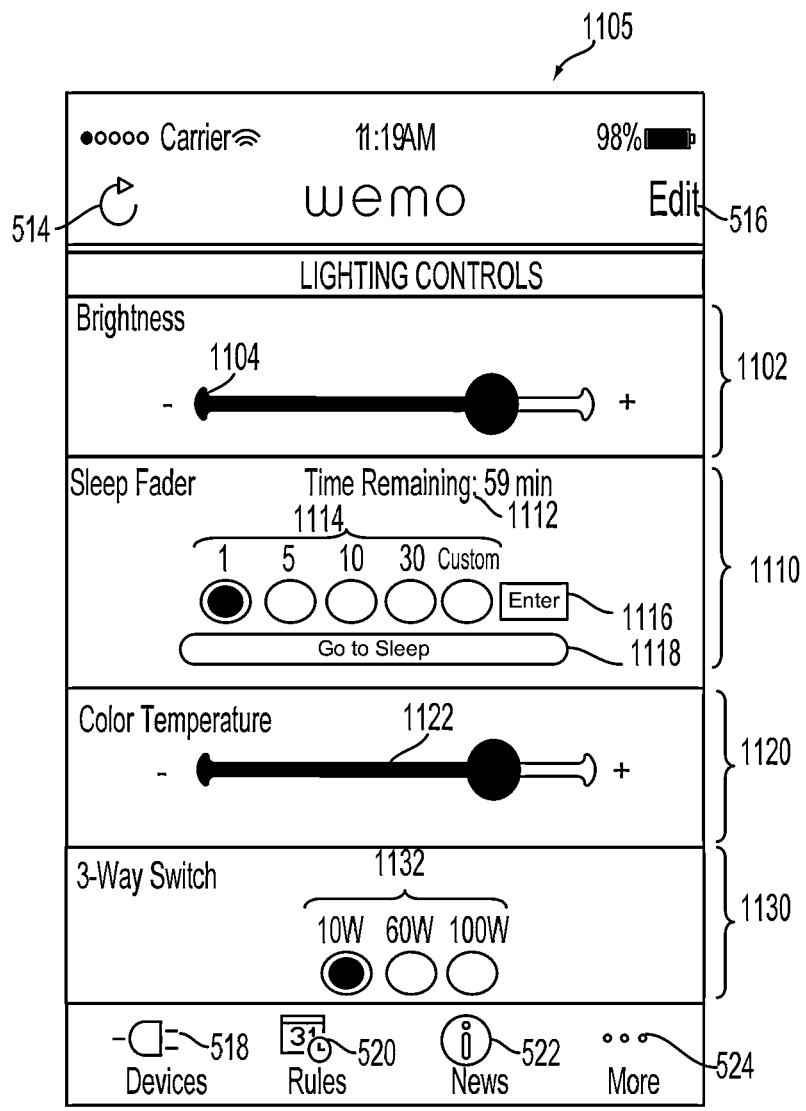

FIG. 11 shows an exemplary display 1100 of an application executing on an access device according to an embodiment of the present invention. Specifically, the display 1100 shows an example of a visual interface that can be displayed by the application. The display 1100 can present one or more interactive elements or interactive areas to enable control of one or more devices in a network. For example, the display 1100 can be presented in response to an interaction with the rules icon 520 or the more icon 524. The display 1100 can include one or more elements described earlier, such as interactive elements included in FIG. 5. In some embodiments, the display 1100 can be presented in response to an interaction with the displays described with reference to FIGS. 5-10 or an interaction with a tile, such as any one of the tiles 502A-502C or 902 described earlier. The interaction with the tile can include interaction with an interactive element in the tile.

In the example shown in FIG. 11, the display 1100 includes several visual interfaces 1102, 1110, 1120, and 1130. Each of the visual interfaces 1102, 1110, 1120, and 1130, can correspond to a setting or an attribute to control a device (e.g., a light bulb). Each of the visual interfaces 1102, 1110, 1120, and 1130 can be a modular tile. In some embodiments, the display 1100 can be used to control multiple devices, e.g., devices in a group. Although not shown, the visual interface 1100 can include interactive elements to define one or more rules for controlling operation of a device. For example, a rule can be created to control one or more settings for the device based on a time of day, a date, an event, etc. The visual interface 1100 can include one or more of the visual interfaces 1102, 1110, 1120, and 1130 to be used to specify settings corresponding to a rule.

In the example of FIG. 11, the visual interface 1102 can present an interactive element 1104 to control a brightness setting. The interactive element 1104 can operate similarly to the interactive element 632. Input received from interaction with the interactive element 1104 can correspond to an adjustment of the brightness of a light bulb. The device can be updated based on the adjustment. In some embodiments, the adjustment can be communicated to the network to cause the light bulb to be updated. A status of the light bulb can be updated based on the adjustment and a modular tile corresponding to the light bulb can be presented with the adjustment when the tile is displayed to the user.

The visual interface 1110 can present a set of interactive elements such as the interactive elements 1112-1118 to control a time period for applying changes to attributes and/or settings. The interactive elements 1112-1118 can operate similarly to those described with reference to the visual interface 618 of FIG. 6. In some embodiments, the time period be applied immediately upon selection of the interactive element 1118. In such embodiments, the interactive element 1112 can be updated to indicate a time remaining for the time period. In some embodiments the time period can take effect once the display 1110 disappears. The time period can be applied in different ways other than those described herein.

The visual interface 1120 can present an interactive element 1122 to adjust a color temperature of a light bulb. The interactive element 1122 can input to be received for adjusting a temperature for a light bulb. The interactive element 1122 can enable adjustment of the color temperature within a range of values (e.g., a range of temperatures). The adjustment in the temperature can be applied to the bulb, which can cause the color emitted by the light bulb to change based on the temperature setting.

The visual interface 1130 can present one or more interactive elements 1132 to control a 3-way switch setting for a light bulb. The one or more interactive elements 1132 may correspond to multiple power settings for the light bulb. For example, the interactive elements 1132 can enable selection between different a wattage (e.g., 10 w, 60 W, and 100 W) consumed by the bulb. The adjustment can indicate a change in the wattage or can include the actual wattage amount desired.

Figure 12:
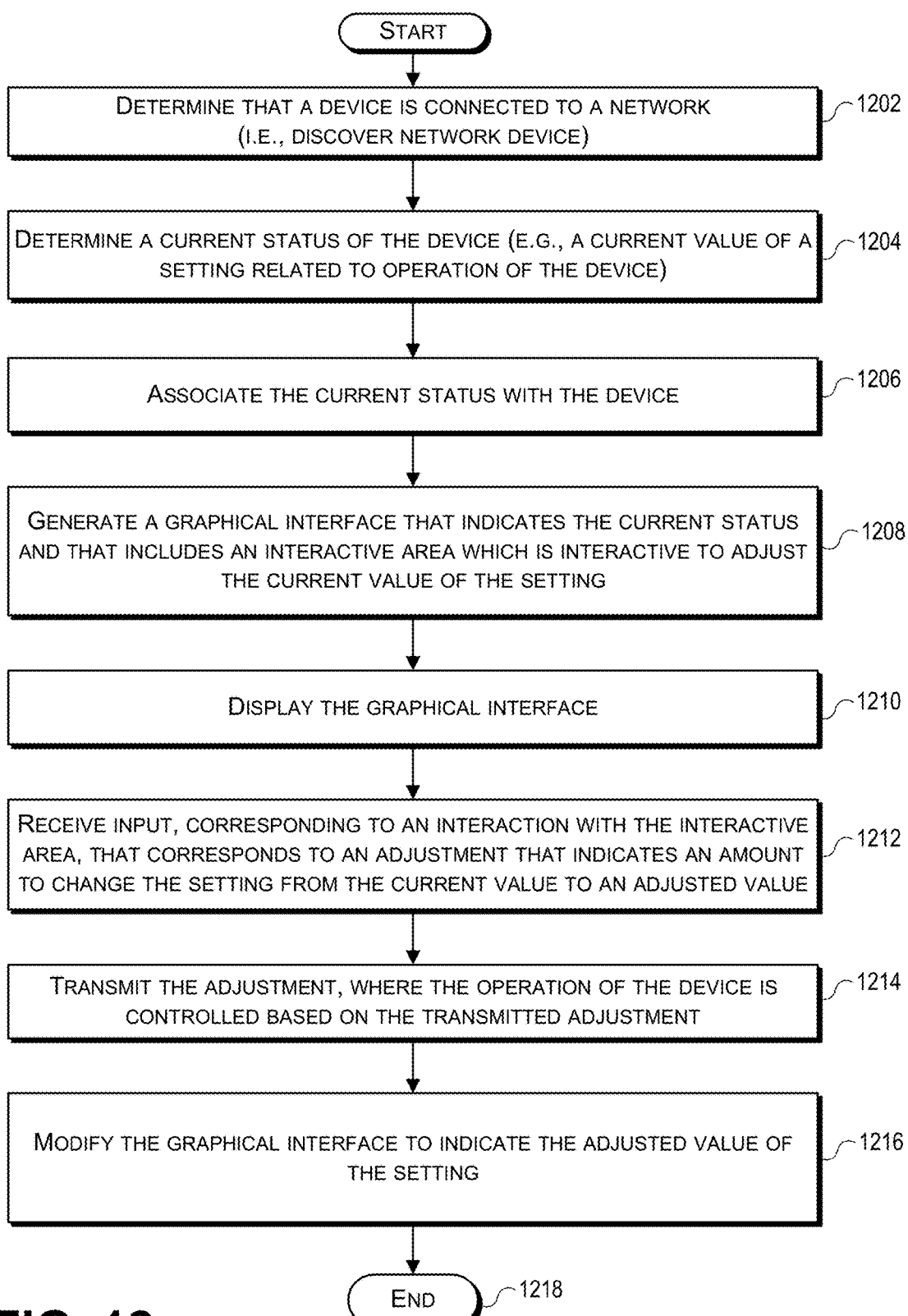
FIG. 12 is a flowchart illustrating a process for controlling attributes and settings related to operation of a device in accordance with some embodiments.

FIG. 12 is a flowchart illustrating embodiments of a process 1200 for controlling attributes and/or settings related to operation of a device in accordance with some embodiments of the present invention. Specifically, the process 1200 provides a technique to remotely adjust settings and/or attributes related to operation of a device that is connected to a network. The technique can be implemented by a computing device (e.g., the access device 108 of FIG. 1) regardless of whether the computing device is within the local network or in remotely in communication with the network. The techniques further enable a user to control the devices in the network without having previously been associated with or connected to those devices.

Process 1200 is illustrated as a logical flow diagram, the operation of which represents operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

At 1202, the process 1200 can include determining that a device (e.g., device 302A, device 302B or device 302C) is connected to a network (e.g., the network 300). Determining that a device is connected to a network can include locating a unique identified associated with the device. A unique identifier for the device can be received from the device itself or from the network. 1202 can be performed as part of discovery process to identify devices in the network. The process 1200 can be performed by a computing device that is not located within the network (i.e., at a remote location outside the network).

At 1204, the process 1200 can include determining a current status of the device. Determining the current status can include determining the current value of a setting or an attribute related to operation of the device. The status can include a current value of a setting or an attribute related to operation of the device. The current value of the setting can be adjustable within a range of values. For example, the setting can correspond to brightness of a light bulb that is adjustable within a range of values corresponding to lumens (e.g., a unit of measure for brightness). The value can correspond to a brightness level for the light bulb. In some embodiments, the process 1200 can include determining whether the device is located within the network or outside of the network. If the device is located within the network, the process 1200 can receive the current status from the device or one or more other devices in the network. If the device is not located within the network, the process 1200 can receive the current status from a cache (e.g., the cache 308) at a cloud network (e.g., the cloud network 114) associated with the network to which the device is connected. In some embodiments, the process 1200 can determine the current status from a local cache of the computing device performing the process 1200.

At 1206, the process 1200 can include associating the current status with the device. In some embodiments, the current value of a setting or an attribute can be associated with the device. For example, the process 1200 can store, a cache of a computing device (e.g., the cache 202 of the access device 108), the current status in association with the device (e.g., the device 302C).

At 1208, the process 1200 can include generating a graphical interface (e.g., any one of the displays 505, 605, 705, 805, 905, 1005) that includes an interactive area and that indicates a current status of the device. The interactive area can be interactive to adjust a current value of the setting. For example, in FIG. 5, the tile 502C can be interactive such that a motion of a finger across the tile 502C can cause a brightness of the light bulb associated with the tile 502C to be adjusted. At 1210, the process 1200 can include displaying the graphical interface.

At 1212, the process 1200 can include receiving input corresponding to an interaction with the interactive area. The input can correspond to an adjustment that indicates an amount to change a setting or an attribute from the current value to an adjusted value. For example, an application executing on the access device 108 can receive via the display 505 an input corresponding to a continuous movement starting from area 550 to area 555 in the display 510. The input can correspond to an adjustment, which indicates an amount to change the setting (e.g., brightness) of a device (e.g., the device 302C) from a current value (e.g., 0 lumens) to an adjusted value (e.g., lumens corresponding to 65% brightness of the light bulb 302C). The adjustment can be determined based on the distance corresponding to the movement from area 550 to area 555.

At 1214, the process 1200 can include transmitting the adjustment. The adjustment can be transmitted to the network. In one example, if a computing device performing the process 1200 is located in the network (e.g., local) to which the device 302C is connected, the adjustment can be received within the updated status by the device 302C in the network. The adjustment can be received with an updated status of the device 302C. The adjustment can be transmitted with the updated status to the network via the cloud network 114 if the computing device is not located in the network. In some embodiments where the device 302C is not powered to an "on" state, the device 302C can receive the updated status upon reconnecting to the network switching to an "on" state.

At 1216, the process 1200 can include modifying the graphical interface based on the adjustment. Continuing with the example discussed above with reference to FIG. 5, the display 505 can be modified to the display 510. The tile 502C can be modified to be presented in the display 510. The tile 502C can indicate a modified status 506C of the device 302C based on the adjustment.

It will be appreciated that process 1200 is illustrative and that variations and modifications are possible. Steps described as sequential may be executed in parallel, order of steps may be varied, and steps may be modified, combined, added or omitted. Process 1200 can be performed for each device that is determined to be connected to the network. It should be noted that process 1200 can be performed concurrently for other devices that are determined to be connected to the network. Process 1200 can be performed for any number of settings and/or attributes that are related to operation of a device. Process 1200 can be performed several times to make adjustments to a setting or an attribute related to operation of a device.

Figure 13:
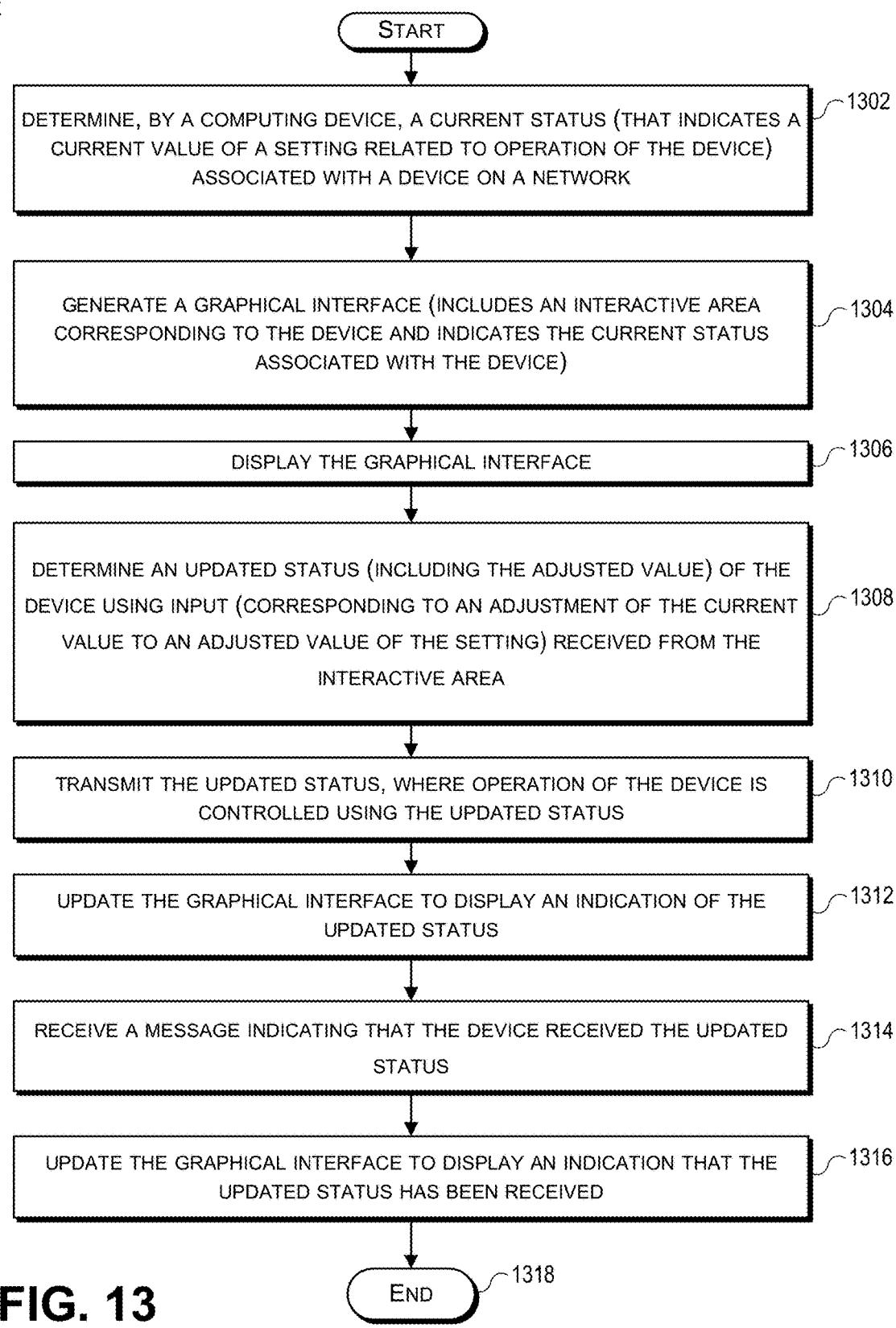
FIG. 13 is a flowchart illustrating a process for displaying, in a graphical interface, status related to operation of a device in accordance with some embodiments.

FIG. 13 is a flowchart illustrating embodiments of a process 1300 for displaying, in a graphical interface, status related to operation of a device in accordance with some embodiments. The technique can be implemented by a computing device (e.g., the access device 108 of FIG. 1) regardless of whether the computing device is within the local network or in remotely in communication with the network.

Process 1300 is illustrated as a logical flow diagram, the operation of which represents operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Beginning at 1302, the process 1300 can include determining a current status associated with a device on a network. The current status can indicate a current value of a setting related to operation of the device.

At block 1304, the process 1300 can include generating a graphical interface (e.g., any one of the graphical interfaces 505, 605, 705, 805, 905, 1005). The graphical interface can include an interactive area corresponding to the device. The graphical interface can indicate the current status associated with the device. At block 1306, the process 1300 displaying the graphical interface.

At block 1308, the process 1300 can include determining an updated status of the device using input received from the interactive area. The input can correspond to an adjustment of the current value to an adjusted value of the setting. The updated status can include the adjusted value.

At block 1310, the process 1300 can include transmitting the updated status. Operation of the device can be controlled using the updated status.

At block 1312, the process 1300 can include updating the graphical interface to display an indication of the updated status. At block 1314, the process 1300 can include receiving a message indicating that the device received the updated status. At block 1316, the process 1300 can include updating the graphical interface to display an indication that the updated status has been received.

It will be appreciated that process 1300 is illustrative and that variations and modifications are possible. Steps described as sequential may be executed in parallel, order of steps may be varied, and steps may be modified, combined, added or omitted. Process 1300 can be performed for each device that is determined to be connected to the network. It should be noted that process 1300 can be performed concurrently for other devices that are determined to be connected to the network. Process 1300 can be performed for any number of settings and/or attributes that are related to operation of a device. Process 1300 can be performed several times to display status indicating adjustments to a setting or an attribute related to operation of a device.

Figure 14:
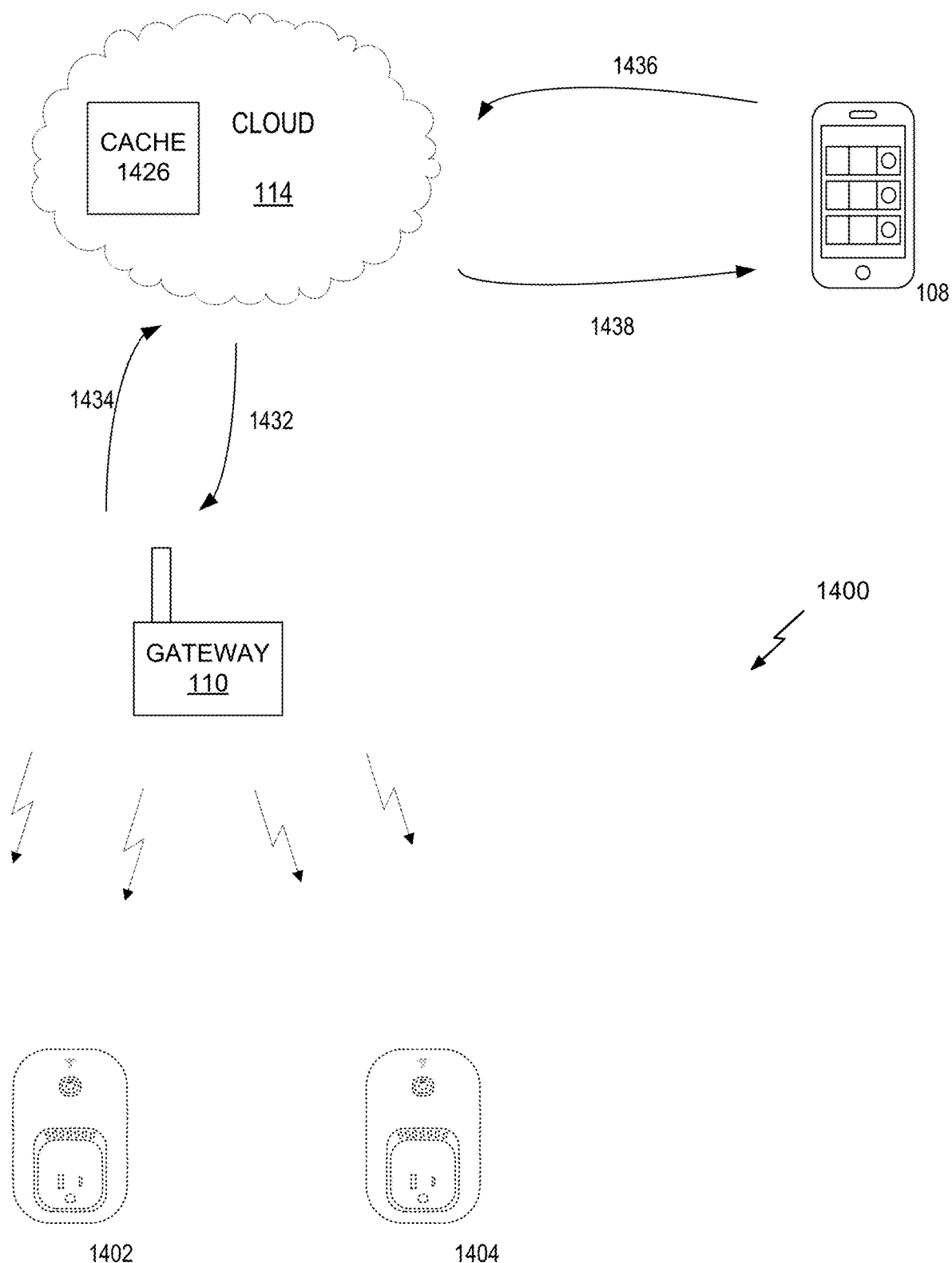
FIG. 14 is an illustration of an example of a network environment, in accordance with some embodiments.

FIG. 14 illustrates an access device 108 that is located remotely from network 1400 (e.g. local area network), according to embodiments of the present invention. Local area network 1400 includes gateway 110 and network devices 1402 and 1404 (which may be, for example, the same as any one of devices 302A, 302B, or 302C in FIGS. 3 and 4), as shown in FIG. 14. However, network 1400 may also include a variety of other network devices and one or more access devices directly connected to network 1400. Gateway 110 is connected to cloud network 114, and allows network devices 1402 and 1404 to connect to cloud 114, the internet, or other external networks via gateway 110. In some embodiments, the network devices 1402 and 1404 may include home automation devices that allow a user to access, control, and/or configure various home appliances located within the user's home, such as a television, radio, light, microwave, iron, and/or the like.

Access device 108 is not directly connected to network 1400. Instead, access device 108 is external to network 1400 and may connect to cloud network 114 and to network 1400 via cloud network 114. As noted, network devices 1402 and 1404 may change status on a periodic basis. In some embodiments, even when external to and not directly connected to network 1400, an access device may request to check the status of the devices on the network. When access device 108 seeks to check the status of any device on the network, the access device 108 may transmit/send a communication 1436 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 1438 of such status data to the access device 108. For example, after network devices 1402 and 1404 are turned on, authenticated and are a part of network 1400, network devices 1402 and 1404 may communicate their statuses to cloud network 114. Furthermore, any time the status of network devices 1402 and 1404 changes, the device that incurred a status change may push/send information (e.g. an indication) of that status change to cloud network 114. Cloud network 114 may store, in cache 1426 or otherwise, the statuses (which may be time stamped in metadata or otherwise) of network devices 1402 and 1404. Therefore, when access device 108 requests from cloud network 114 the statuses of devices on network 1400, cloud 114 may send its most recently stored/updated statuses to access device 108.

To obtain the most updated status data of devices within network 1400, cloud 114 may, upon receiving a request for status data related to network devices 1402 and 1404, transmit/send a communication 1432 (e.g. request, query, etc.) for such status data to network devices 1402 and 1404 via gateway 110. Once network devices 1402 and 1404 receive this request, network devices 1402 and 1404 may send a communication 1434 (e.g. updated status data) to cloud 114 to replace the previously stored/cached statuses in cache 1426. Upon receipt of updated status data 1434 from network 1400, cloud 114 may send a communication 1438 of such status data to the access device 108.

However, the process of cloud network 114 requesting updated statuses from network devices 1402 and 1404 within network 1400 may cause latency within the system. More specifically, the time required for cloud network 114 to request updated statuses from network devices 1402 and 1404 and to in turn receive updated statuses from network devices 1402 and 1404 may be substantially greater than the time required for cloud network 114 to send its currently stored statuses (without being updated) for network devices 1402 and 1404 to access device 108. For example, of the total time required for access device 108 to receive updated statuses from cloud network 114, 80% or more of that total time may include cloud network 114 requesting updated statuses from network devices 1402 and 1404. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 1402 and 1404 is the transmission of data between cloud 114 and network devices 1402 and 1404, the access device 108 and cloud network 114 may maximize efficiency by minimizing the effect of the transmission of data between cloud 114 and network devices 1402 and 1404 on the whole process/system.

Figure 15:
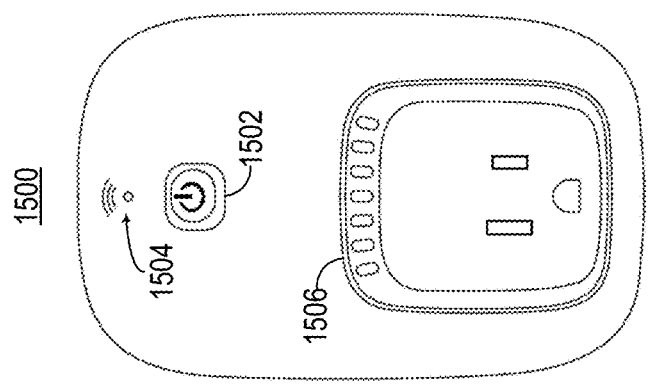
FIG. 15 is an illustration of an example of a front view of a network device, in accordance with an embodiment.
Figure 16:
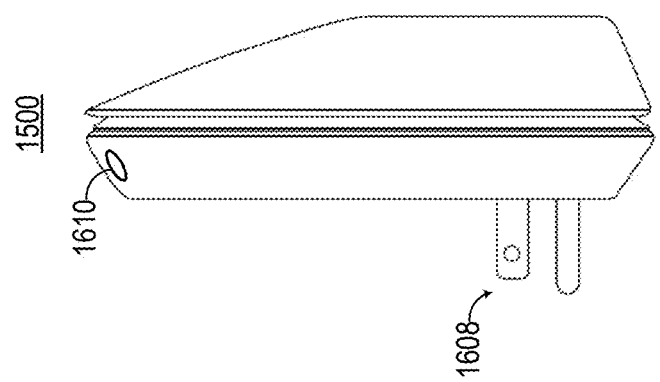
FIG. 16 is an illustration of an example of a side view of a network device, in accordance with an embodiment.

FIG. 15 illustrates an example of a front view of a network device 1500. FIG. 16 illustrates an example of a side view of the network device 1500. The network device 1500 may include any of the network devices 102, 104, 106, 302A, 302B, or 302C described herein. In some embodiments, the network device 1500 may be a home automation network device. For example, the network device 1500 may include a home automation switch that may be coupled with a home appliance. A user may wirelessly access the network device 1500 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 1500 may include a WiFi enabled switch that connects home appliances and other electronic devices to a compatible 802.11b/g/n/ac WiFi network. The network device 1500 may thus allow users to locally or remotely turn devices on or off from anywhere, program customized notifications, and/or change device status. The network device 1500 may further allow a user to create custom schedules or have devices respond to sunrise or sunset.

The network device 1500 includes an power switch 1502 that may be depressed in order to turn the network device 1500 on and off. In some embodiments, a light source may be integrated with or located behind the power switch. For example, a light-emitting diode (LED) may be located on a circuit board under the power button 1502. The light source may be illuminated when the network device 1500 is powered on, and may not be illuminated when the network device 1500 is powered off.

The network device 1500 further includes a communications signal indicator 1504. The signal indicator 1504 may indicate whether the network device 1500 has access to a communications signal, such as a WiFi signal. For example, the signal indicator 1504 may include a light source (e.g., a LED) that illuminates when the network device 1500 is connected to a communications signal. The light source may depict different colors or other characteristics (e.g., flashing, dimming, or the like) to indicate different levels of signal strength or mode of operation.

The network device 1500 includes a restore button 1610. The restore button 1610 may allow a user to reset the network device 1500 to factory default settings. For example, upon being depressed, the restore button 1610 may cause all software on the device to be reset to the settings that the network device 1500 included when purchased from the manufacturer.

The network device 1500 further includes a plug 1608 and an outlet 1506. The plug 1608 allows the network device 1500 to be plugged into a wall socket, such as a socket providing 120V, 220V, or the like. In turn, an appliance may be plugged into the outlet 1506. Once the network device 1500 is registered according to the techniques described above, an appliance plugged into the socket 1506 may be controlled by a user using an access device (e.g., access device 108).

Figure 17:
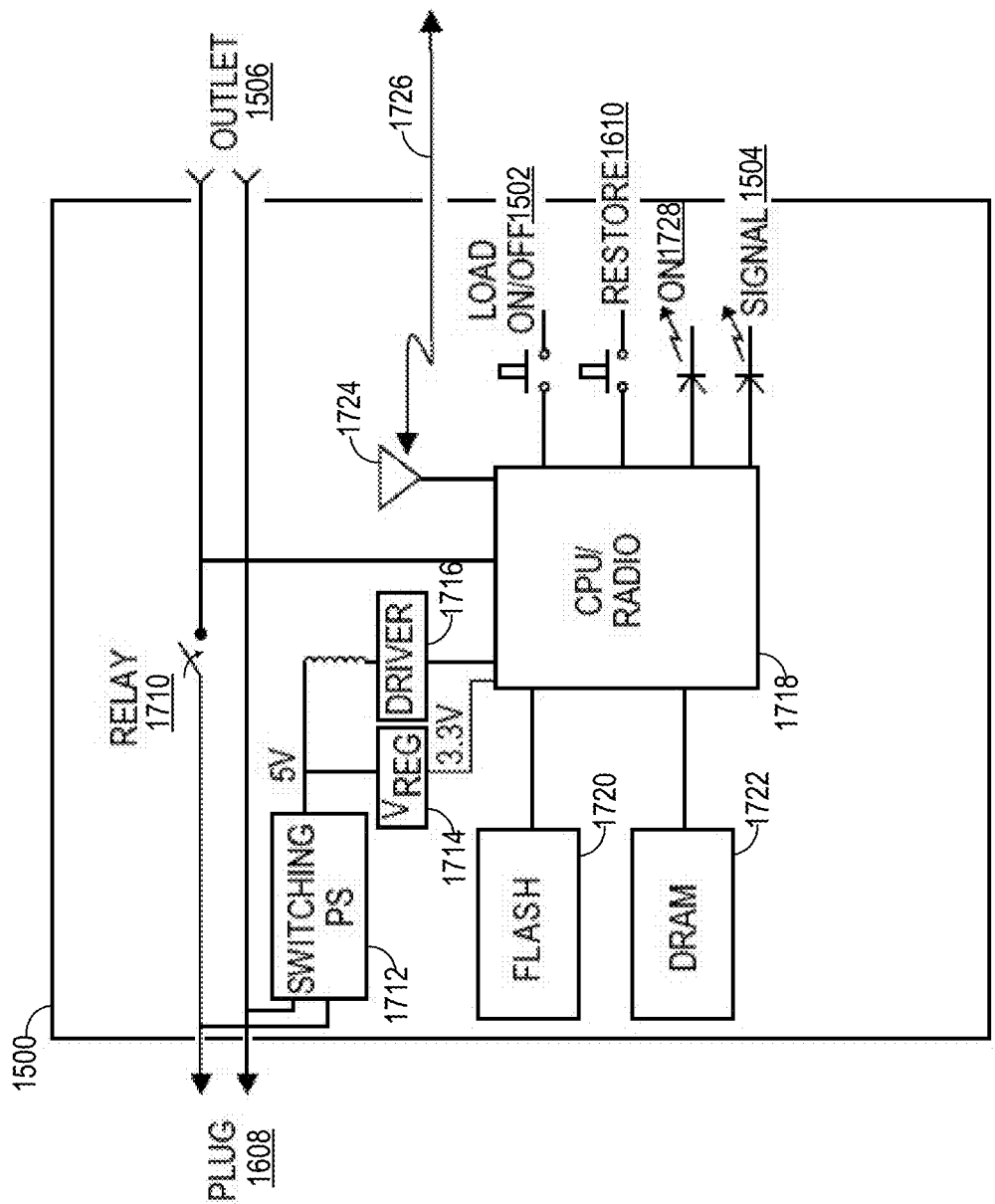
FIG. 17 is an example of a block diagram of a network device, in accordance with an embodiment.

FIG. 17 is an example of a block diagram of the network device 1500 depicting different hardware and/or software components of the network device 1500. As described above with respect to FIGS. 15 and 16, the network device 1500 includes the outlet 1506, the plug 1608, the power button 1502, the restore button 1610, and the communications signal indicator 1504. The network device 1500 also includes light source 1728 associated with the power button 1502. As previously described, the light source 1728 may be illuminated when the network device 1500 is powered on.

The network device 1500 further includes a relay 1710. The relay 1710 is a switch that controls whether power is relayed from the plug 1608 to the outlet 1506. The relay 1710 may be controlled either manually using the power button 1502 or remotely using wireless communication signals. For example, when the power button 1502 is in an ON position, the relay 1710 may be closed so that power is relayed from the plug 1608 to the outlet 1506. When the power button 1502 is in an OFF position, the relay 1710 may be opened so that current is unable to flow from the plug 1608 to the outlet 1506. As another example, an application or program running on an access device may transmit a signal that causes the relay 1710 to be opened or closed. For instance, an access application may display a graphical interface on the access device that includes a power button. The user may tap or otherwise select the power button, and the access application may send a communication signal (e.g., over a WiFi network) to the network device 1500 instructing the network device 1500 to open or close the relay 1710.

The network device 1500 further includes flash memory 1720 and dynamic random access memory (DRAM) 1722. The flash memory 1720 may be used to store instructions or code relating to an operating system, one or more applications, and any firmware. The flash memory 1720 may include nonvolatile memory so that any firmware or other program can be can updated. In the event the network device 1500 loses power, information stored in the flash memory 1720 may be retained. The DRAM 1722 may store various other types of information needed to run the network device 1500, such as all runtime instructions or code.

The network device 1500 further includes a CPU/Radio 1718. The CPU/Radio 1718 controls the operations of the network device 1500. For example, the CPU/Radio 1718 may execute various applications or programs stored in the flash memory 1720 and/or the dynamic random access memory (DRAM) 1722. The CPU/Radio 1718 may also receive input from the various hardware and software components, interpret the input, and perform one or more functions in response to the input. As one example, the CPU/Radio 1718 may determine whether the power button 1502 has been pressed, and determines whether the relay 1710 needs to be opened or closed. The CPU/Radio 1718 may further perform all communications functions in order to allow the network device 1500 to communicate with other network devices, one or more gateways, a cloud network, and/or one or more access devices. While the CPU and radio of the network device 1500 are shown to be combined in the CPU/Radio 1718, one of ordinary skill in the art will appreciate that, in some embodiments, the CPU and radio may be separately located within the network device 1500. For example, CPU circuitry may be situated at a separate location on a circuit board from the location of radio circuitry, the CPU circuitry may be located on a different circuit board from the radio circuitry, or the like. Further, the network device 1500 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 1500 does not include a cellular or other broadband network transceiver radio or interface, and thus may not be configured to directly communicate with a broadband network. In some embodiments, the network device 1500 may include a cellular or broadband network transceiver radio, and may be configured to communicate with a broadband network using the broadband network transceiver radio.

The network device 1500 may communicate with other devices and/or networks via antenna 1724. For example, antenna 1724 may include a 2.4 GHz antenna, a 5 GHz antenna, or the like, that can transmit and receive WiFi communications signals. The network device 1500 may include other types of antennas that can communicate Bluetooth® signals, Zigbee® signals, Ultra-Wideband (UWB) signals, WiFi-Direct signals, BLE signals, and/or the like. In some embodiments, the antenna 1724 may be configured to communicate different types of signals, such as the WiFi signals, Bluetooth® signals, Zigbee® signals, UWB signals, WiFi-Direct signals, BLE signals, and/or the like. In some embodiments, the network device 1500 may include multiple antennas for communicating the different types of communication signals. As one example, the network device 1500 may include both a 2.4 GHz antenna and a 5 GHz antenna.

The network device 1500 further includes a driver 1716, a switching power supply 1712, and a voltage regulator 1714. The driver 1716 may include instructions or code that can be used to translate control signals or commands received from applications running on the DRAM 1722 to commands that the various hardware components in the network device 1500 can understand. In some embodiments, the driver 1716 may include an ambient application running on the DRAM 1722. The switching power supply 1712 may be used to transfer power from the outlet in which the plug 1608 is connected to the various loads of the network device 1500 (e.g., CPU/Radio 1718). The switching power supply 1712 may efficiently convert the voltage and current characteristics of the electrical power to a level that is appropriate for the components of the network device 1500. For example, the switching power supply 1712 may perform AC-DC conversion. In some embodiments, the switching power supply 1712 may be used to control the power that is relayed from the plug 1608 to the outlet 1506. The voltage regulator 1714 may be used to convert the voltage output from the switching power supply 1712 to a lower voltage usable by the CPU/Radio 1718. For example, the voltage regulator 1714 may regulate the DC voltage from 5V to 3.3V.

In various embodiments, functions may be stored as one or more computer-program products, such as instructions or code, in a non-transitory machine-readable storage medium, such as the flash memory 1720 and/or the DRAM 1722. The network device 1500 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 1-14, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 1-14. The memory, such as the flash memory 1720 and/or the DRAM 1722, may be a processor-readable memory and/or a computer-readable memory that stores software code (programming code, instructions, etc.) configured to cause a processor(s) within the CPU/Radio 1718 to perform the functions described. In other embodiments, one or more of the functions described may be performed in hardware.

A set of these instructions and/or code might be stored on a non-transitory machine-readable storage medium, such as the flash memory 1720 and/or the DRAM 1722. In some cases, the storage medium might be incorporated within a computer system, such as the CPU/Radio 1718. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 1500 and/or might take the form of source and/or installable code, which, upon compilation and/or installation on the network device 1500 (e.g., using any of a variety of generally available compilers, installation programs, compression/decompression utilities, etc.) then takes the form of executable code.

It should be appreciated that the network device 1500 may have other components than those depicted in FIGS. 15-17. Further, the embodiment shown in the figures are only one example of a network device that may incorporate an embodiment of the invention. In some other embodiments, network device 1500 may have more or fewer components than shown in the figure, may combine two or more components, or may have a different configuration or arrangement of components.

Figure 18:
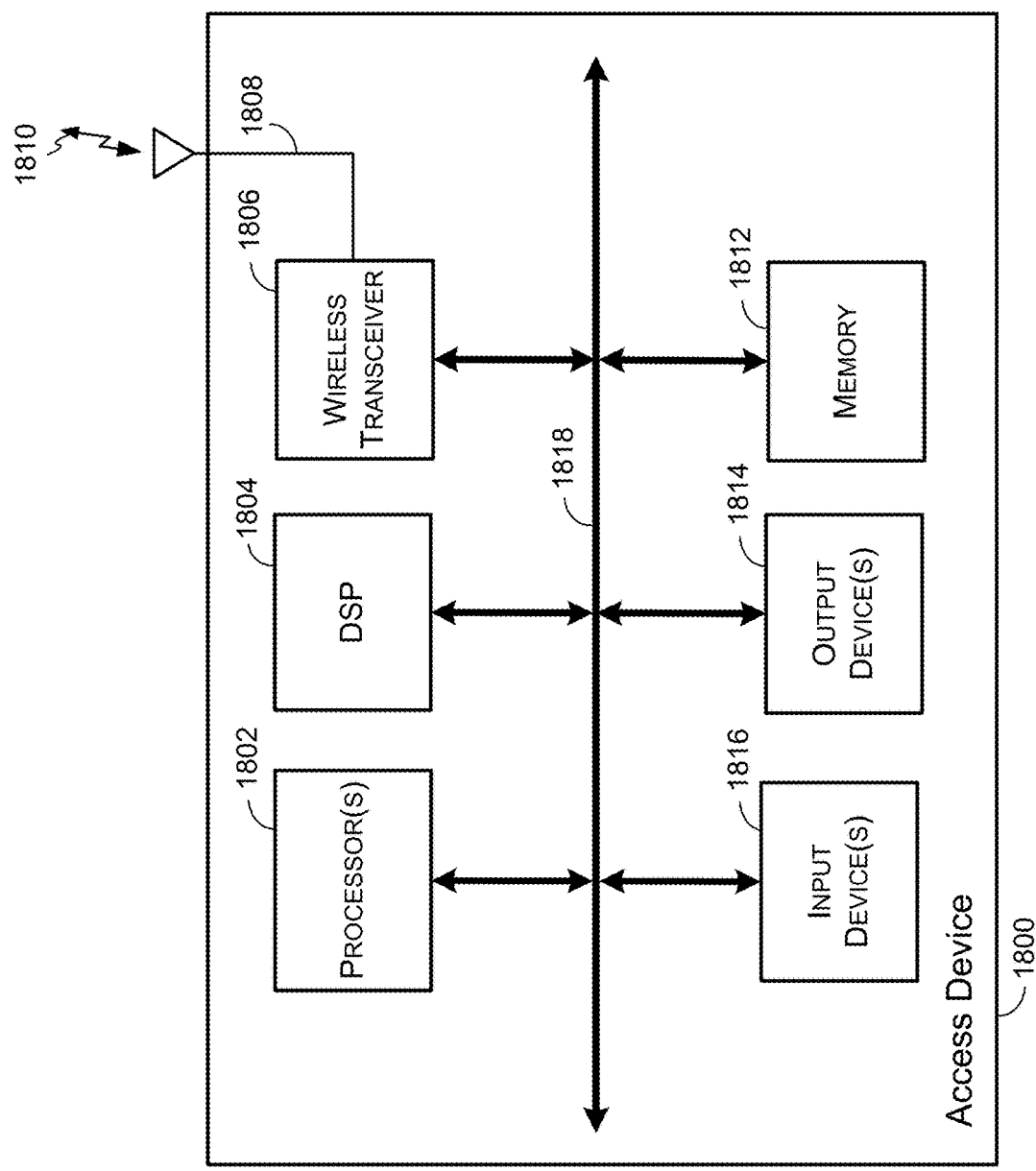
FIG. 18 is a block diagram illustrating an example of an access device, in accordance with some embodiments.

FIG. 18 illustrates an example of an access device 1800. The access device 1800 may include any human-to-machine interface with network connection capability that allows access to a network. For example, the access device 1800 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 1800 includes hardware elements that can be electrically coupled via a bus 1818 (or may otherwise be in communication, as appropriate). In one embodiment, the bus 1818 can be used for the processor(s) 1802 to communicate between cores and/or with the memory 1812. The hardware elements may include one or more processors 1802, including without limitation one or more general-purpose processors and/or one or more special-purpose processors (such as digital signal processing chips, graphics acceleration processors, and/or the like); one or more input devices 1816, which can include without limitation a camera, a mouse, a keyboard, a touch sensitive screen, a touch pad, a keypad, and/or the like; and one or more output devices 1814, which can include, without limitation, a display, a printer, and/or the like.

The access device 1800 may include one or more wireless transceivers 1806 connected to the bus 1818. The wireless transceiver 1806 may be operable to receive wireless signals (e.g., signal 1810) via antenna 1808. The wireless signal 1810 may be transmitted via a wireless network. In some embodiments, the wireless network may be any wireless network such as a wireless local area network (e.g., local area network 100), such as WiFi, a Personal Access Network (PAN), such as Bluetooth®, Zigbee®, or UWB, or a cellular network (e.g. a GSM, WCDMA, LTE, CDMA2000 network). Wireless transceiver 1806 may be configured to receive various radio frequency (RF) signals (e.g., signal 1810) via antenna 1808 from one or more gateways, network devices, other access devices, cloud networks, and/or the like. Access device 1800 may also be configured to decode and/or decrypt, via the DSP 1804 and/or processor(s) 1802, various signals received from one or more gateways, network devices, other access devices, cloud networks, and/or the like.

The access device 1800 may further include (and/or be in communication with) one or more non-transitory machine-readable storage mediums or storage devices (e.g., memory 1812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1812, such as RAM, ROM, FLASH, or disc drive, and executed by processor(s) 1802 or DSP 1804. The access device 1800 can also comprise software elements (e.g., located within the memory 1812), including, for example, an operating system, device drivers, executable libraries, and/or other code, such as one or more application programs, which may comprise computer programs implementing various functions. Memory 1812 may be a non-transitory machine-readable storage medium, processor-readable memory, and/or a computer-readable memory that stores the one or more computer-program products configured to cause the processor(s) 1802 and/or DSP 1804 to perform the various functions. In other embodiments, the various functions described may be performed in hardware.

Figure 19:
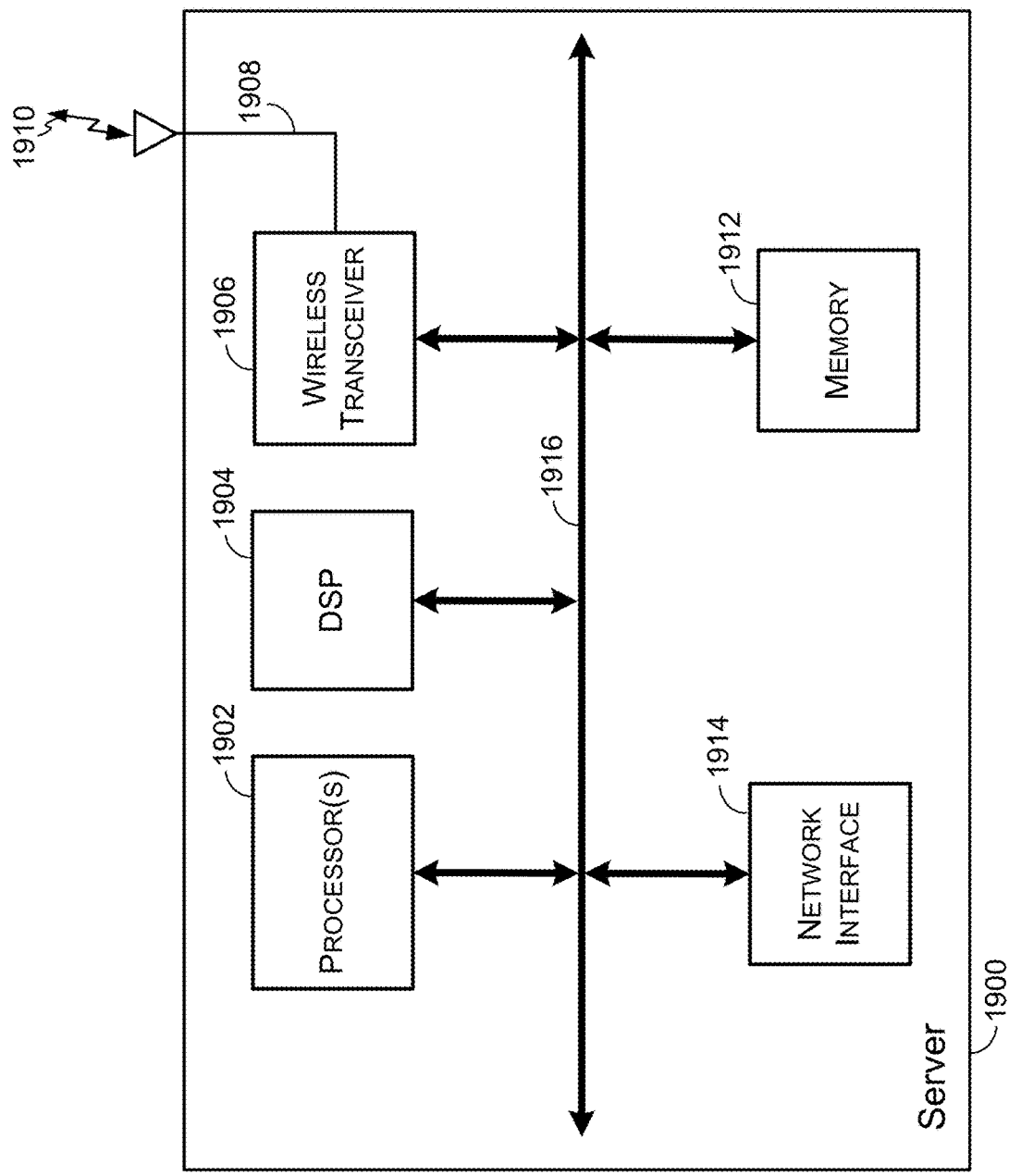
FIG. 19 is a block diagram illustrating an example of a server, in accordance with some embodiments.

FIG. 19 illustrates an example of a server 1000. The server 1000 includes hardware elements that can be electrically coupled via a bus 1916 (or may otherwise be in communication, as appropriate). In one embodiment, the bus 1916 can be used for the processor(s) 1902 to communicate between cores and/or with the memory 1912. The hardware elements may include one or more processors 1902, including without limitation one or more general-purpose processors and/or one or more special-purpose processors (such as digital signal processing chips, graphics acceleration processors, and/or the like), memory 1912, DSP 1904, a wireless transceiver 1906, a bus 1916, and antenna 1908. Furthermore, in addition to the wireless transceiver 1906, server 1900 can further include a network interface 1914 to communicate with a network (e.g., a local area network, a network of a preferred carrier, Internet, etc.).

The server 1900 may further include (and/or be in communication with) one or more non-transitory machine-readable storage mediums or storage devices (e.g., memory 1912), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1912. The server 1900 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 1-14. The memory 1912 may be a non-transitory machine-readable storage medium, processor-readable memory, and/or a computer-readable memory that stores the one or more computer-program products configured to cause the processor(s) 1902 to perform the functions described. In other embodiments, one or more of the functions described may be performed in hardware.

A set of these instructions and/or code might be stored on a non-transitory machine-readable storage medium, such as the memory 1912. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 1900 and/or might take the form of source and/or installable code, which, upon compilation and/or installation on the server 1900 (e.g., using any of a variety of generally available compilers, installation programs, compression/decompression utilities, etc.) then takes the form of executable code.

Figure 20:
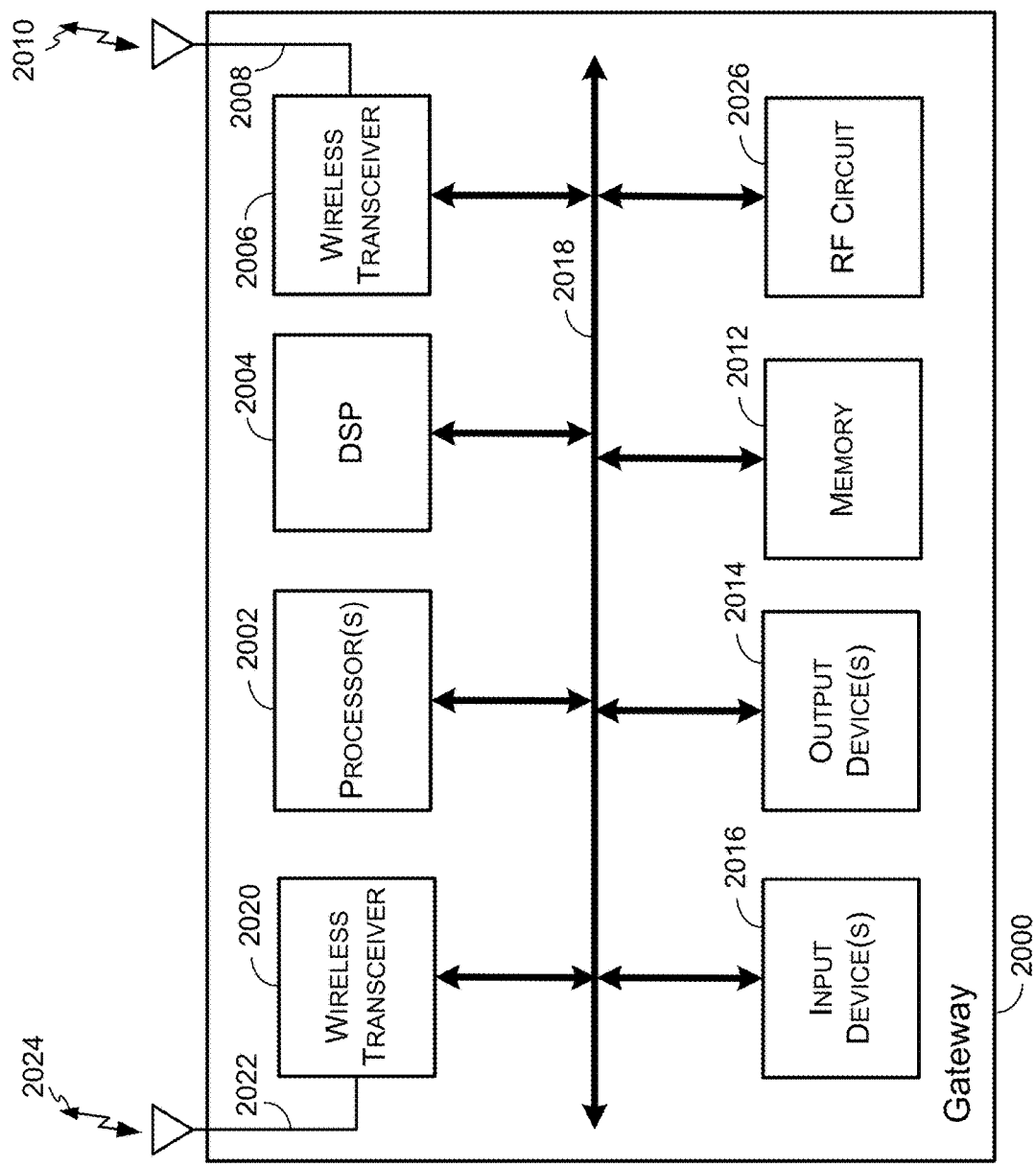
FIG. 20 is a block diagram illustrating an example of a gateway, in accordance with some embodiments.

FIG. 20 illustrates an example of a gateway 2000. The gateway 2000 may include a range extending device, a router, an access point, a modem, and/or any other device that provides network access among one or more computing devices and/or external networks. For example, the gateway 2000 may include a router gateway with access point and router functionality, and may further include an Ethernet switch and/or a modem. As another example, the gateway 2000 may include a range extending gateway that may be used to improve signal range and strength within a network by taking an existing signal from another gateway (e.g., a router gateway, an access point, or the like) and rebroadcasting the signal to create a second logical network.

The gateway 2000 includes hardware elements that can be electrically coupled via a bus 2018 (or may otherwise be in communication, as appropriate). In one embodiment, the bus 2018 can be used for the processor(s) 2002 to communicate between cores and/or with the memory 2012. The hardware elements may include one or more processors 2002, including without limitation one or more general-purpose processors and/or one or more special-purpose processors (such as digital signal processing chips, graphics acceleration processors, and/or the like); one or more input devices 2016, which can include without limitation one or more buttons, a keyboard, a keypad, a touch sensitive screen, a touch pad, and/or the like; and one or more output devices 2014, which can include, without limitation, a display, light or sound indicators, and/or the like.

The gateway 2000 may include one or more wireless transceivers 2006 and 2020 connected to the bus 2018. The wireless transceiver 2006 may be operable to receive wireless signals (e.g., a wireless signal 2010) via an antenna 2008. The wireless transceivers 2020 may be operable to receive wireless signals (e.g., a wireless signal 2014) via an antenna 2022. The wireless transceivers 2006 and 2020 may each include a WiFi transceiver radio designed to transmit and receive signals using frequencies of a specific frequency band, which may be referred to herein as "WiFi circuits." For example, wireless transceiver 2006 may include a 2.4 GHz WiFi circuit, and wireless transceiver 2020 may include a 5 GHz WiFi circuit. Accordingly, the gateway 2000 may include a single WiFi circuit for a first WiFi frequency band, and a single WiFi circuit for a second WiFi frequency band. In some embodiments, the gateway 2000 may include multiple wireless transceivers (not shown) for each available frequency band. The antennas 2008 and 2022 may include multiple band antennas that can transmit and/or receive signals over different frequency bands.

The gateway 2000 may further include radio frequency (RF) circuit 2026. In some embodiments, the wireless transceivers 2006 and 2020 may be integrated with or coupled to the RF circuit 2026 so that the RF circuit 2026 includes the wireless transceivers 2006 and 2020. In some embodiments, the wireless transceivers 2006 and 2020 and the RF circuit 2026 are separate components. The RF circuit 2026 may include a RF amplifier that may amplify signals received over antennas 2008 and 2022. The RF circuit 2026 may also include a power controller that may be used to adjust signal amplification by the RF amplifier. The power controller may be implemented using hardware, firmware, software, or any combination thereof.

The wireless signals 2010 and 2024 may be transmitted via a wireless network. In some embodiments, the wireless network may be any wireless network such as a wireless local area network (e.g., local area network 190), such as WiFi™, a Personal Access Network (PAN), such as Bluetooth®, Zigbee®, or UWB, or a cellular network (e.g. a GSM, WCDMA, LTE, CDMA2000 network). Wireless transceivers 2006 and 2020 may be configured to receive various radio frequency (RF) signals (e.g., signals 2010 and 2024) via antennas 2008 and 2024, respectively, from one or more other gateways, access devices, network devices, cloud networks, and/or the like. Gateway 2000 may also be configured to decode and/or decrypt, via the DSP 2004 and/or processor(s) 2002, various signals received from one or more gateways, network devices, cloud networks, and/or the like.

The gateway 2000 may include a power supply (not shown) that can power the various components of the gateway 2000. The power supply may include a switch-mode power supply, a linear power supply, a push-pull power supply, or any other suitable type of power supply. In some embodiments, the gateway 2000 may include multiple power supplies. For example, a switch-mode power supply may be used to condition input power, and a linear power supply may be used to power the RF circuit 2026. The power supply may be configured to operate over various ranges of appropriate input voltages.

The gateway 2000 may further include (and/or be in communication with) one or more non-transitory machine-readable storage mediums or storage devices (e.g., memory 2012), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2012, such as RAM, ROM, FLASH, or disc drive, and executed by processor(s) 2002 or DSP 2004. The gateway 2000 can also comprise software elements (e.g., located within the memory 2012), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. **, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 1-14. The memory 2012 may be a non-transitory machine-readable storage medium, processor-readable memory, and/or a computer-readable memory that stores the one or more computer-program products configured to cause the processor(s) 2002 to perform the functions described. In other embodiments, one or more of the functions described may be performed in hardware.

A set of these instructions and/or code might be stored on a non-transitory machine-readable storage medium, such as the memory 2012. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 2000 and/or might take the form of source and/or installable code, which, upon compilation and/or installation on the gateway 2000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
    transmitting, by a computing device on a network, a request to identify the computing device as a trusted device on the network, wherein after transmitting the request, the network authorizes the computing device as a trusted device;
    displaying, by the computing device, a graphical interface, wherein the graphical interface includes an interactive area corresponding to a network device, and wherein the interactive area indicates a current status of an operation setting associated with the network device;
    receiving input corresponding to an interaction at the interactive area of the graphical interface, wherein the operation setting is adjusted using the input;
    determining whether the computing device is connected to one or more access points connected to the network device, wherein the one or more access points facilitate communication with the network, wherein when the computing device is connected to the one or more access points, the computing device is determined to be located within the network;
    automatically transmitting the adjusted operation setting, wherein the determination is used to select a short-range network channel or a cloud-based channel to transmit the adjusted operation setting, wherein when the computing device is determined to be located within the network, the adjusted operation setting is automatically transmitted using the short-range network channel, wherein when the computing device is determined not to be located within the network, the adjusted operation setting is automatically transmitted using the cloud-based channel, and wherein operation of the network device is modified using the adjusted operation setting without requiring the computing device to provide a login credential after determining that computing device is a trusted device; and
    updating the graphical interface to display an updated status indicating the adjusted operation setting.

2. The computer-implemented method of claim 1, further comprising:
    receiving a message indicating that the network device received the adjusted operation setting, wherein the message is received using the short-range network channel when the computing device is located within the network, and wherein the message is received using the cloud-based channel when the computing device is not located within the network; and
    updating the graphical interface to display an indication that the adjusted operation setting has been received.

3. The method of claim 2, wherein the message includes a result, and wherein the result indicates whether operation of the network device has been adjusted based on the transmitted adjusted operation setting.

4. The method of claim 3, wherein updating the graphical interface includes modifying the graphical interface using the result.

5. The method of claim 3, wherein the result indicates a status of settings related to operation of the network device.

6. The method of claim 1, wherein updating the graphical interface includes modifying the graphical interface when the adjusted operation setting is determined.

7. The method of claim 1, wherein updating the graphical interface includes displaying the indication in the interactive area.

8. The method of claim 1, further comprising:
    receiving a message, wherein the message is received in a communication from the network device.

9. The method of claim 1, further comprising:
receiving a message, wherein the message is received with an updated status from the network device.

10. The method of claim 1, wherein one or more network devices are coupled to computing devices capable of controlling network device operations.

11. The method of claim 1, wherein the computing device is included in an access device.

12. The method of claim 1, wherein the setting related to operation of the network device is adjustable between a plurality of values.

13. A system, comprising:
one or more data processors; and
a non-transitory computer-readable storage medium containing instructions which when executed on the one or more data processors, cause the one or more processors to perform operations including:
transmitting, by a computing device on a network, a request to identify the computing device as a trusted device on the network, wherein after transmitting the request, the network authorizes the computing device as a trusted device;
displaying, by the computing device, a graphical interface, wherein the graphical interface includes an interactive area corresponding to a network device, and wherein the interactive area indicates a current status of an operation setting associated with the network device;
receiving input corresponding to an interaction at the interactive area of the graphical interface, wherein the operation setting is adjusted using the input;
determining whether the computing device is connected to one or more access points connected to the network device, wherein the one or more access points facilitate communication with the network, wherein when the computing device is connected to the one or more access points, the computing device is determined to be located within the network;
automatically transmitting the adjusted operation setting, wherein the determination is used to select a short-range network channel or a cloud-based channel to transmit the adjusted operation setting, wherein when the computing device is determined to be located within the network, the adjusted operation setting is automatically transmitted using the short-range network channel, wherein when the computing device is determined not to be located within the network, the adjusted operation setting is automatically transmitted using the cloud-based channel, and wherein operation of the network device is modified using the adjusted operation setting without requiring the computing device to provide a login credential after determining that computing device is a trusted device; and
updating the graphical interface to display an updated status indicating the adjusted operation setting.

14. The system of claim 13, wherein the operations further comprise:
receiving a message indicating that the network device received the adjusted operation setting, wherein the message is received using the short-range network channel when the computing device is located within the network, and wherein the message is received using the cloud-based channel when the computing device is not located within the network; and
updating the graphical interface to display an indication that the adjusted operation setting has been received.

15. The system of claim 14, wherein the message is received from a device that is different from the network device to which the adjusted operation setting is transmitted.

16. The system of claim 13, further comprising:
receiving a message, wherein the message includes a result, wherein the result indicates whether operation of the network device has been adjusted based on the transmitted adjusted operation setting, and wherein updating the graphical interface includes modifying the graphical interface using the result.

17. The system of claim 13, wherein updating the graphical interface includes modifying the graphical interface when the updated status is determined.

18. A computer-program product tangibly embodied in a non-transitory machine-readable storage medium, including instructions configured to cause a data processing apparatus to:
transmit, by a computing device on a network, a request to identify the computing device as a trusted device on the network, wherein after transmitting the request, the network authorizes the computing device as a trusted device;
display, by the computing device, a graphical interface, wherein the graphical interface includes an interactive area corresponding to a network device, and wherein the interactive area indicates a current status of an operation setting associated with the network device;
receive input corresponding to an interaction at the interactive area of the graphical interface, wherein the operation setting is adjusted using the input;
determine whether the computing device is connected to one or more access points connected to the network device, wherein the one or more access points facilitate communication with the network, wherein when the computing device is connected to the one or more access points, the computing device is determined to be located within the network;
automatically transmit the adjusted operation setting, wherein the determination is used to select a short-range network channel or a cloud-based channel to transmit the adjusted operation setting, wherein when the computing device is determined to be located within the network, the adjusted operation setting is automatically transmitted using the short-range network channel, wherein when the computing device is determined not to be located within the network, the adjusted operation setting is automatically transmitted using the cloud-based channel, and wherein operation of the network device is modified using the adjusted operation setting without requiring the computing device to provide a login credential after determining that computing device is a trusted device; and
update the graphical interface to display an updated status indicating the adjusted operation setting.

19. The computer-program product of claim 18, wherein the instructions further comprise:
receive a message indicating that the network device received the adjusted operation setting, wherein the message is received using the short-range network channel when the computing device is located within the network, and wherein the message is received using the cloud-based channel when the computing device is not located within the network; and
update the graphical interface to display an indication that the adjusted operation setting has been received.

20. The computer-program product of claim 19, wherein the message includes a result, and wherein the result indicates whether operation of the network device has been adjusted based on the transmitted adjusted operation setting.

21. The computer-program product of claim 18, wherein updating the graphical interface includes modifying the graphical interface when the updated status is determined.

22. The computer-program product of claim 18, further comprising:
   receiving a message, wherein the message is received in a communication from the network device.

23. The computer-program product of claim 18, wherein the computing device is included in an access device.

* * * * *